US010473385B2

United States Patent
Lee et al.

(10) Patent No.: US 10,473,385 B2
(45) Date of Patent: Nov. 12, 2019

(54) REFRIGERATOR AND CONTROLLING METHOD THEREOF

(71) Applicant: Samsung Electronics Co., Ltd., Suwon-si (KR)

(72) Inventors: Jong Ho Lee, Yongin-si (KR); Jea Won Lee, Hwaseong-si (KR); Byung Mo Yu, Daejeon (KR); Kyung Ho Hwang, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 15/503,531

(22) PCT Filed: Jul. 20, 2015

(86) PCT No.: PCT/KR2015/007509
§ 371 (c)(1),
(2) Date: Feb. 13, 2017

(87) PCT Pub. No.: WO2016/024730
PCT Pub. Date: Feb. 18, 2016

(65) Prior Publication Data
US 2017/0241701 A1    Aug. 24, 2017

(30) Foreign Application Priority Data

Aug. 13, 2014 (KR) .......................... 10-2014-0104951

(51) Int. Cl.
*B01F 3/04* (2006.01)
*F25D 23/12* (2006.01)
(Continued)

(52) U.S. Cl.
CPC .............. *F25D 23/126* (2013.01); *A23L 2/42* (2013.01); *A23L 2/54* (2013.01); *B01F 3/04049* (2013.01);
(Continued)

(58) Field of Classification Search
CPC . B67D 5/56; B67D 1/0022; B01F 3/04; B01F 3/04049
(Continued)

(56) References Cited

U.S. PATENT DOCUMENTS 5,193,746 A    3/1993  Lwamura et al.
6,364,159 B1 *  4/2002  Newman .............. B67D 1/0028
                                                    222/1

(Continued)

FOREIGN PATENT DOCUMENTS

CN    101731714    6/2010
CN    103423936    12/2013
(Continued)

OTHER PUBLICATIONS

Chinese Office Action dated Mar. 5, 2018 in Chinese Patent Application No. 201510497593.1.
(Continued)

*Primary Examiner* — Robert A Hopkins
(74) *Attorney, Agent, or Firm* — Staas & Halsey LLP

(57) ABSTRACT

A refrigerator includes a water tank which stores water, a carbon dioxide cylinder which stores carbon dioxide, a dispenser module which accommodates an external container and supplies the carbon dioxide and the water to the external container, and a controller which supplies the water to the external container and supplies the carbon dioxide to the external container when supplying the water is completed.

14 Claims, 36 Drawing Sheets

(51) Int. Cl.
    *B67D 1/00*         (2006.01)
    *A23L 2/42*         (2006.01)
    *A23L 2/54*         (2006.01)
    *F25D 11/00*       (2006.01)
    *F25D 29/00*       (2006.01)

(52) U.S. Cl.
    CPC ...... *B01F 3/04106* (2013.01); *B01F 3/04794* (2013.01); *B01F 3/04815* (2013.01); *B67D 1/0009* (2013.01); *B67D 1/0022* (2013.01); *B67D 1/0071* (2013.01); *B67D 1/0075* (2013.01); *F25D 11/00* (2013.01); *A23V 2002/00* (2013.01); *B01F 2003/04822* (2013.01); *F25D 29/00* (2013.01); *F25D 2400/361* (2013.01)

(58) Field of Classification Search
    USPC .......................................................... 222/1
    See application file for complete search history.

(56) References Cited

U.S. PATENT DOCUMENTS

2012/0104021 A1     5/2012   Cur et al.
2013/0233888 A1     9/2013   Kim et al.
2013/0309361 A1   11/2013   Kyong et al.

FOREIGN PATENT DOCUMENTS

| | | | |
|---|---|---|---|
| EP | 1005897 | 6/2000 | |
| EP | 1 580 503 A1 | 3/2005 | |
| EP | 1580502 | 9/2005 | |
| EP | 1580502 A1 * | 9/2005 | .......... B01F 3/04794 |
| HU | 9602079 | 5/1999 | |
| JP | 2014023979 A * | 2/2014 | |
| WO | 01/83360 | 11/2001 | |
| WO | 2013/124236 | 8/2013 | |

OTHER PUBLICATIONS

Chinese Office Action dated Jul. 3, 2017 in corresponding Chinese Patent Application No. 201510497593.1, 8 pages.
Partial Supplementary European Search Report dated Jun. 5, 2018 in European Patent Application No. 15831470.8.
Chinese Notice of Allowance dated Aug. 16, 2018 in Chinese Patent Application No. 201510497593.1.
Extended European Search Report dated Sep. 18, 2018 in European Patent Application No. 15831470.8.
International Search Report dated Oct. 21, 2015 in corresponding International Application No. PCT/KR2015/007509.
Written Opinion of the International Searching Authority dated Oct. 21, 2015 in corresponding International Application No. PCT/KR2015/007509.

* cited by examiner

[Fig. 1]
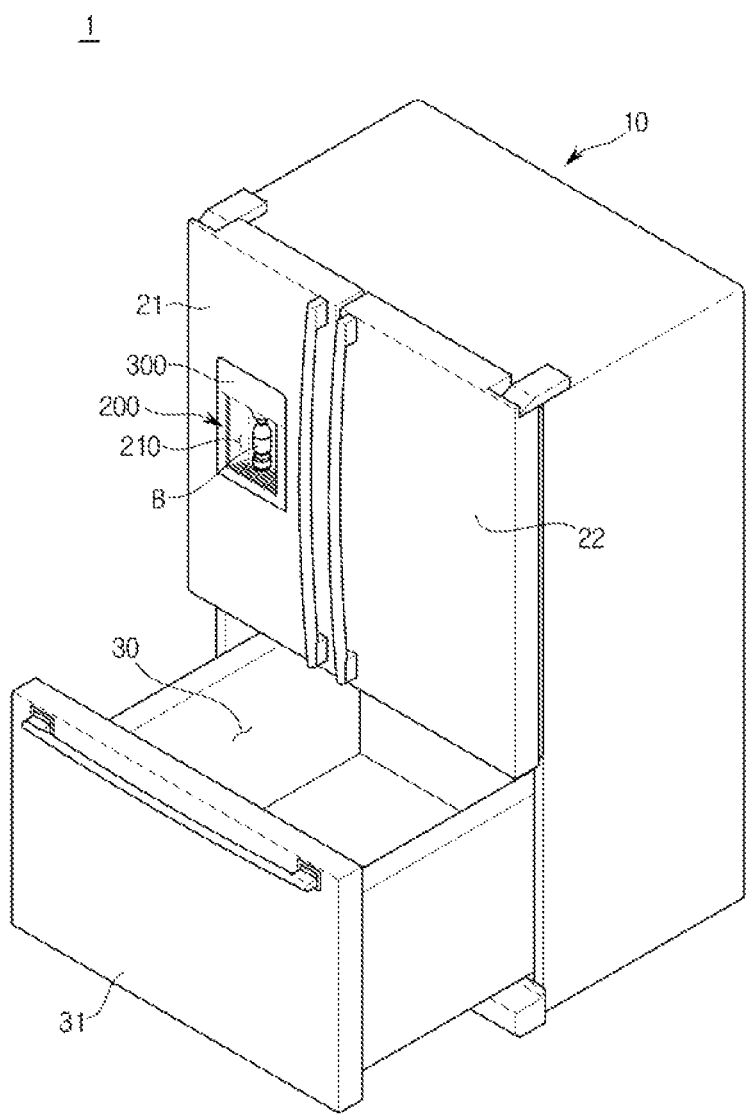

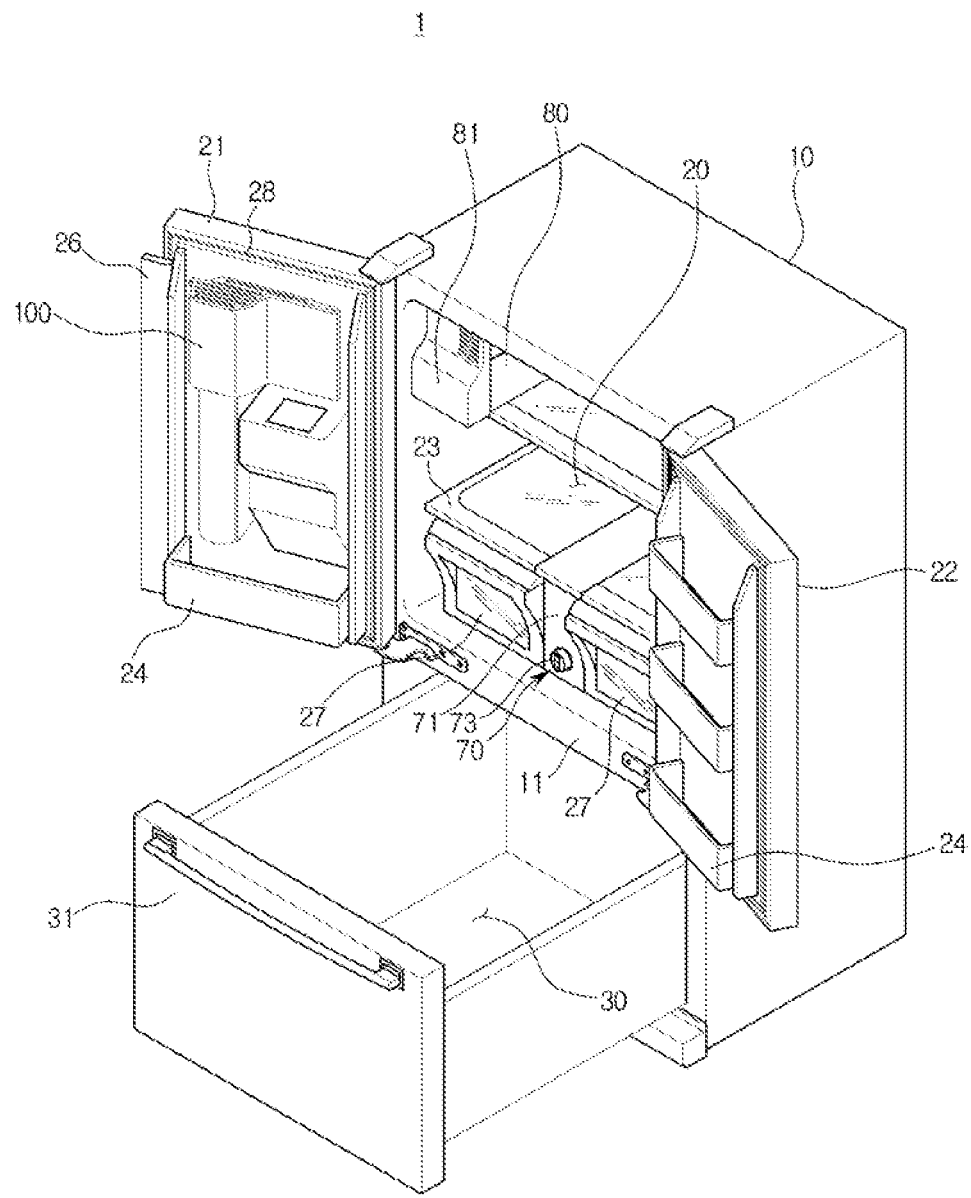
[Fig. 2]

[Fig. 3]
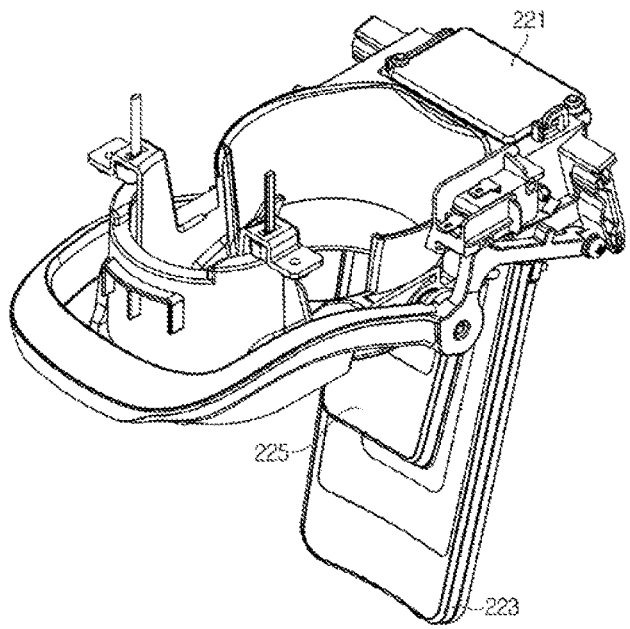
[Fig. 4a]
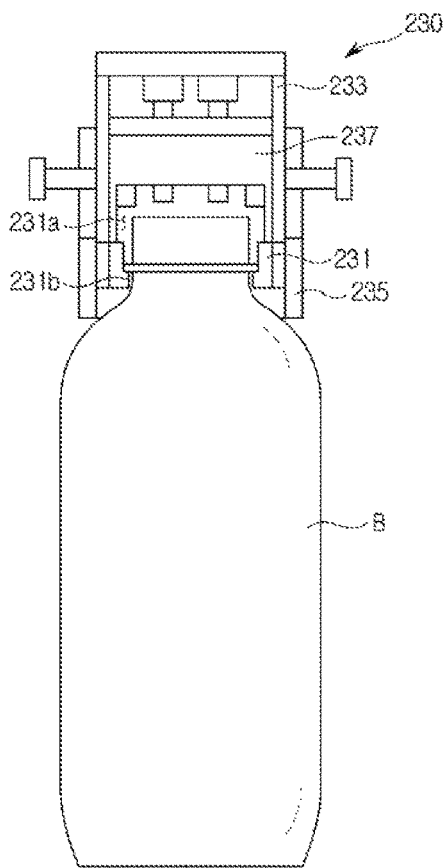

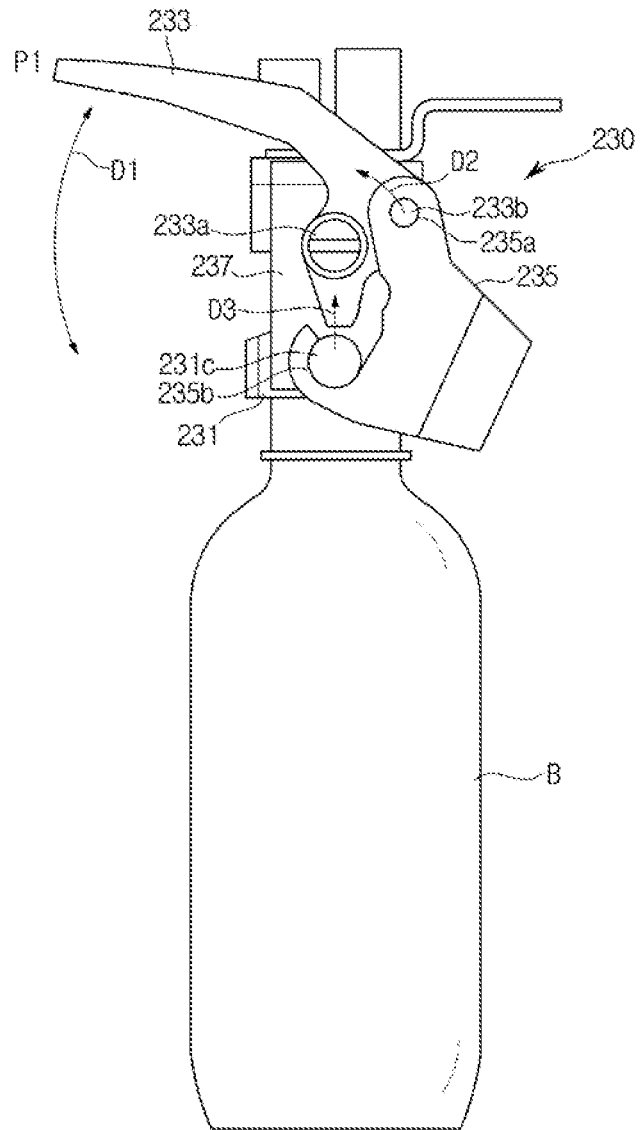
[Fig. 4b]

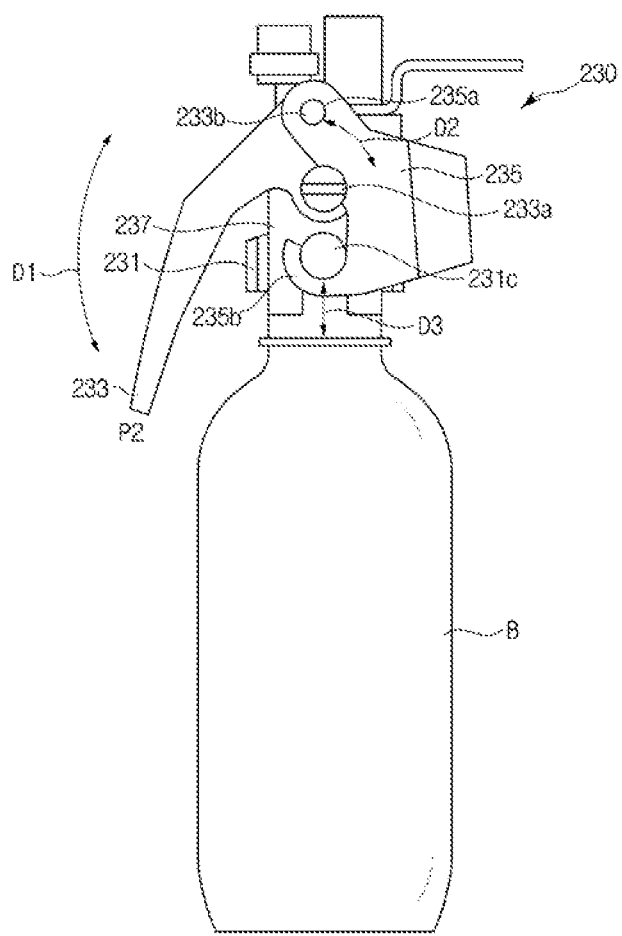
[Fig. 4c]

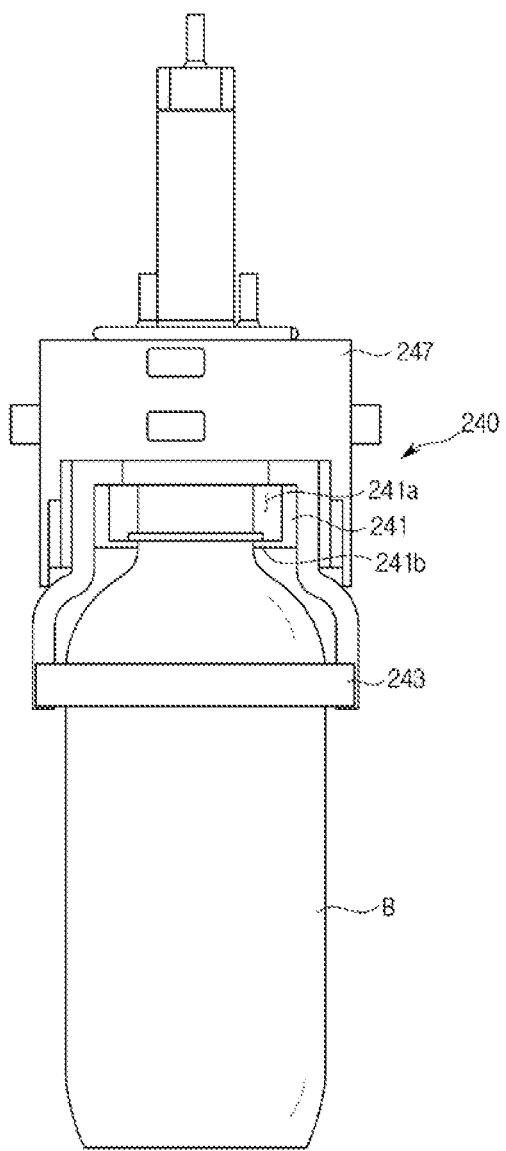
[Fig. 5a]

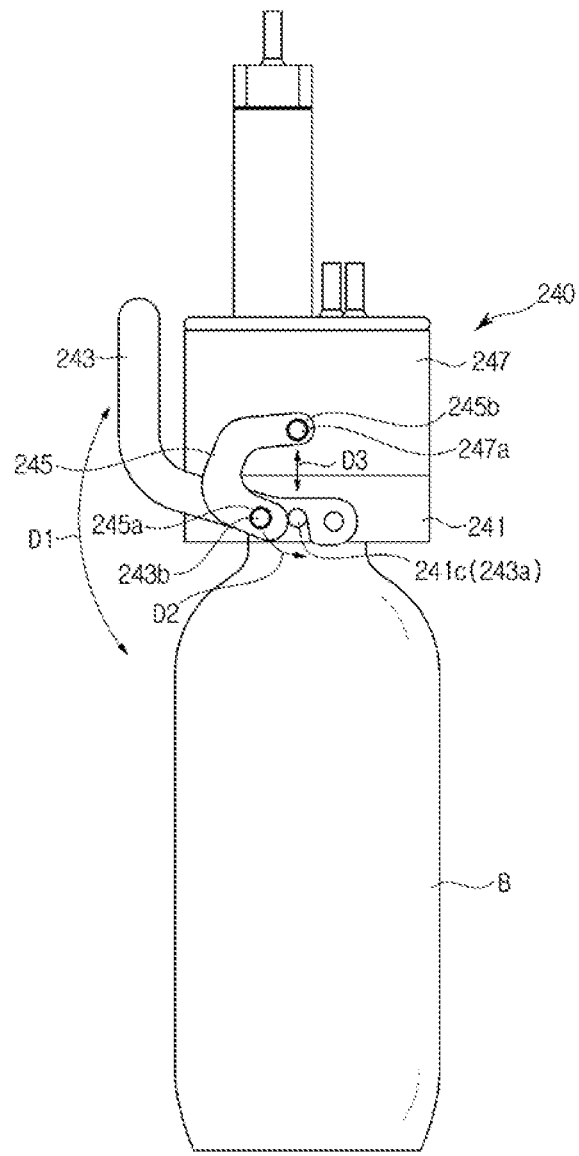
[Fig. 5b]

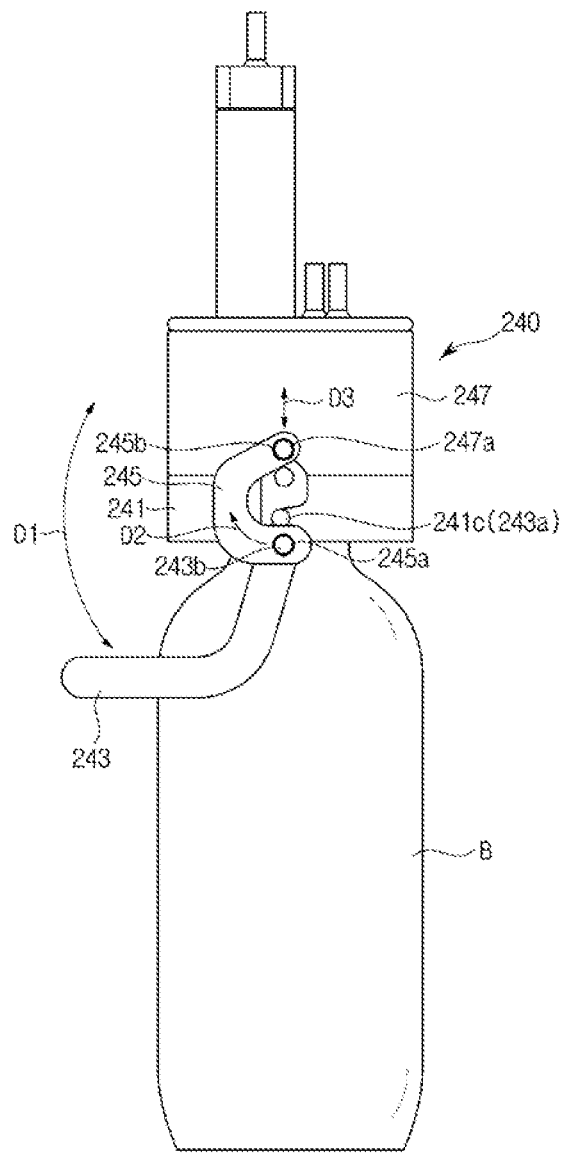
[Fig. 5c]

[Fig. 6a]
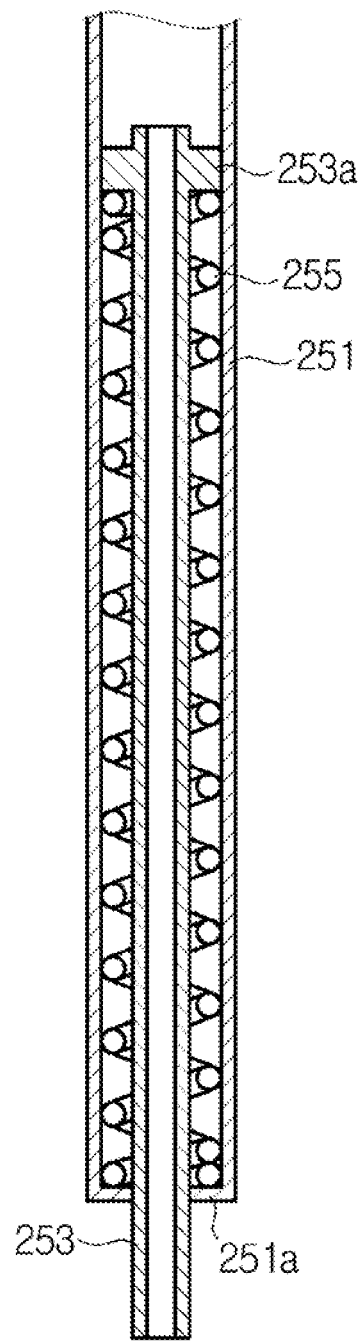

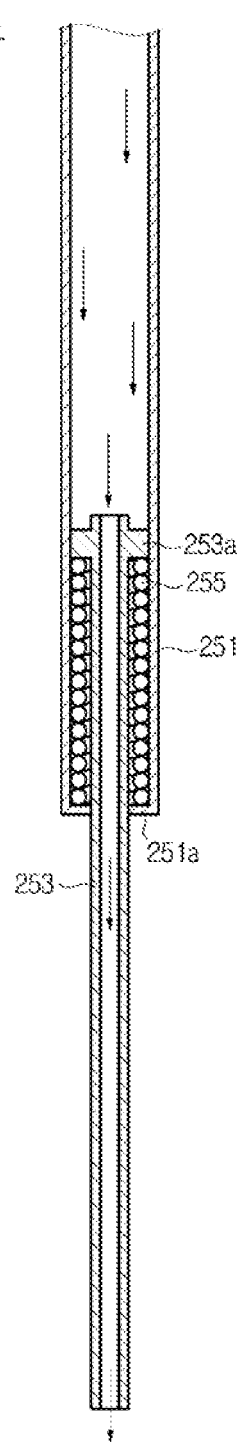
[Fig. 6b]

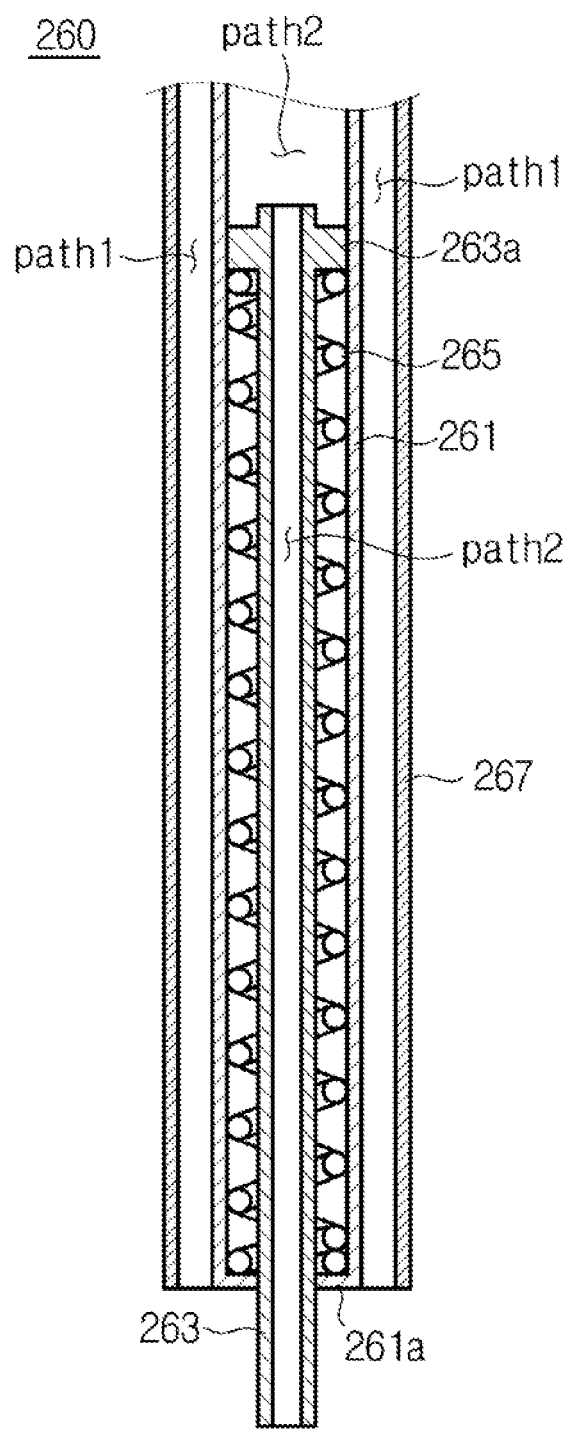
[Fig. 7a]

[Fig. 7b]
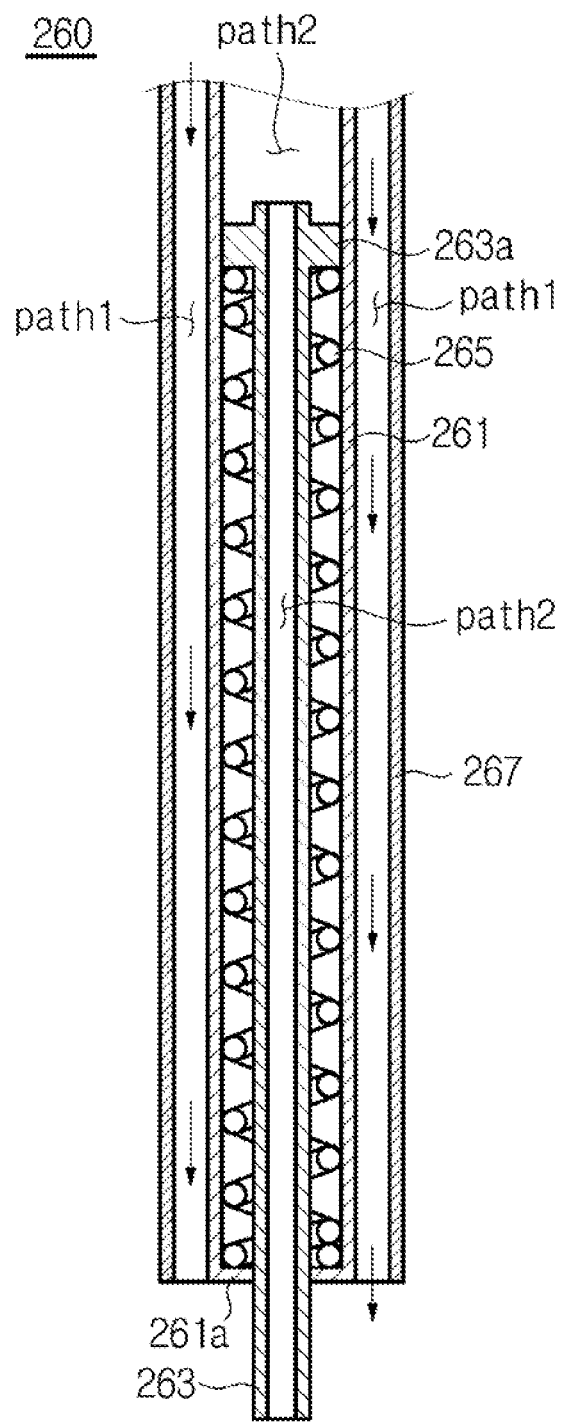

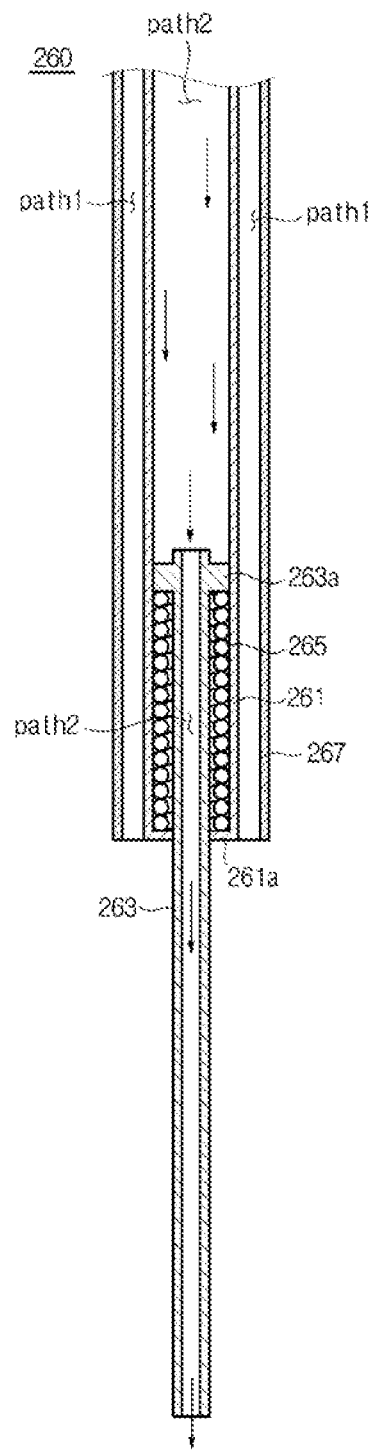
[Fig. 7c]

[Fig. 8]
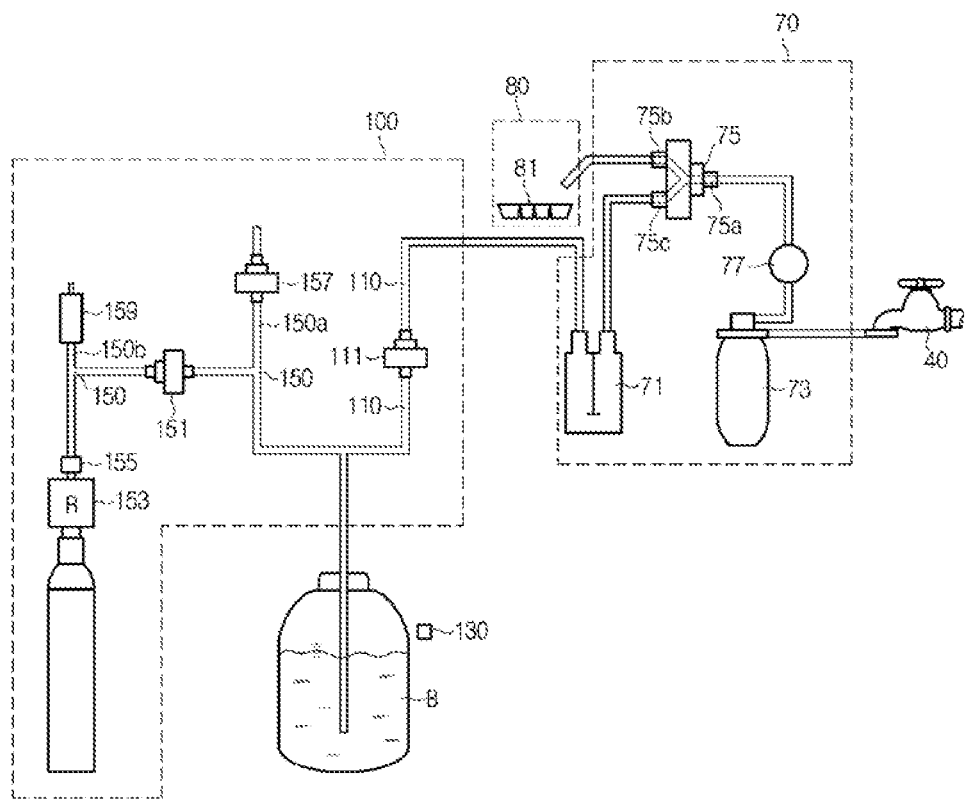

[Fig. 9]
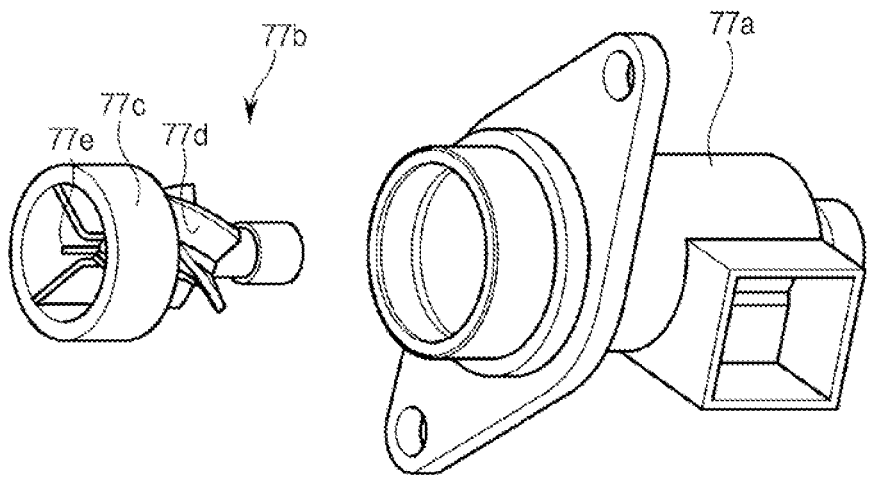
(a)
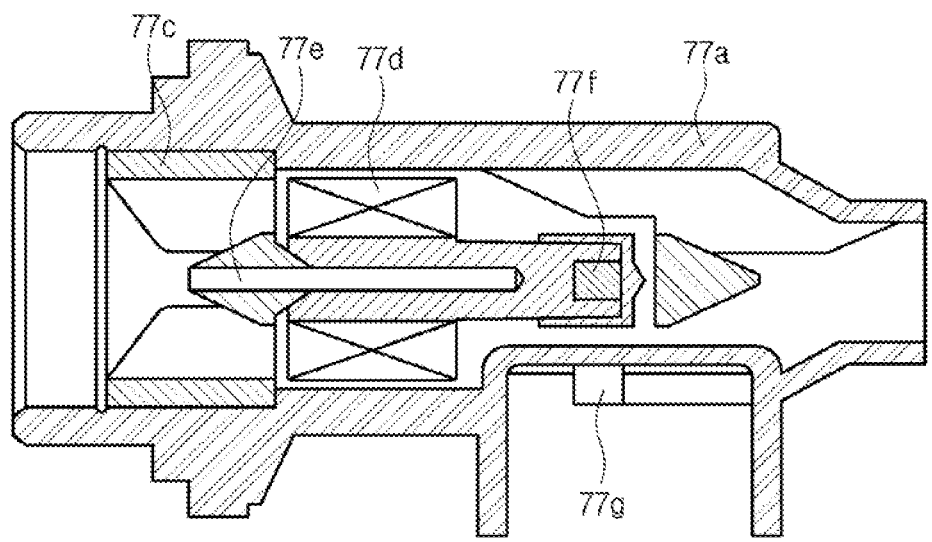
(b)

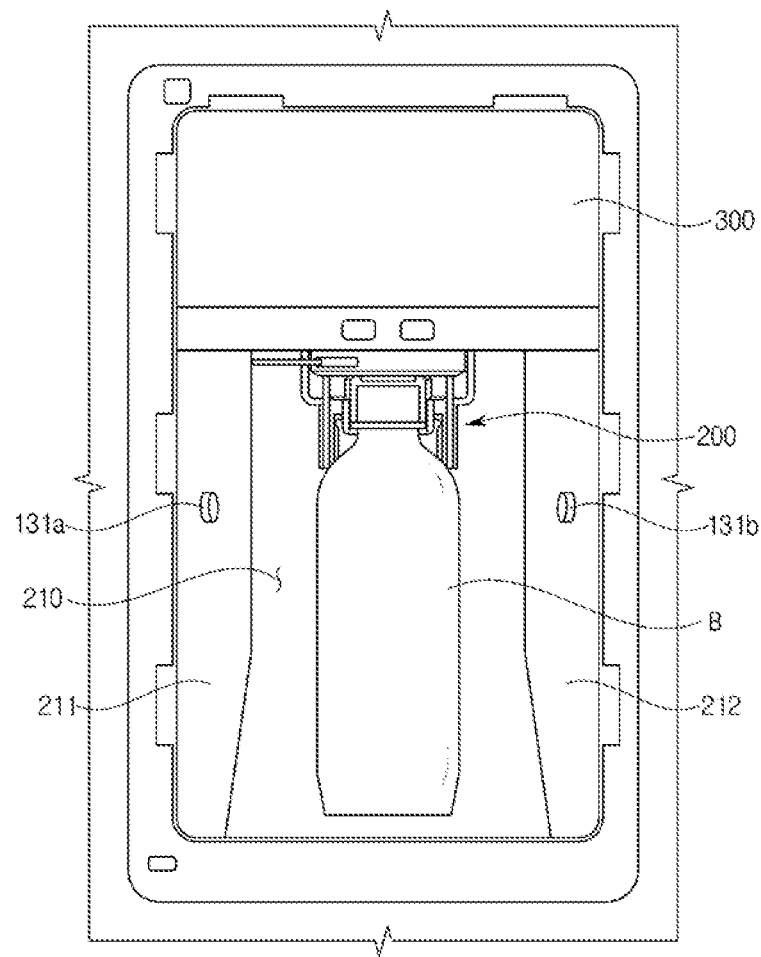
[Fig. 10]

[Fig. 11]
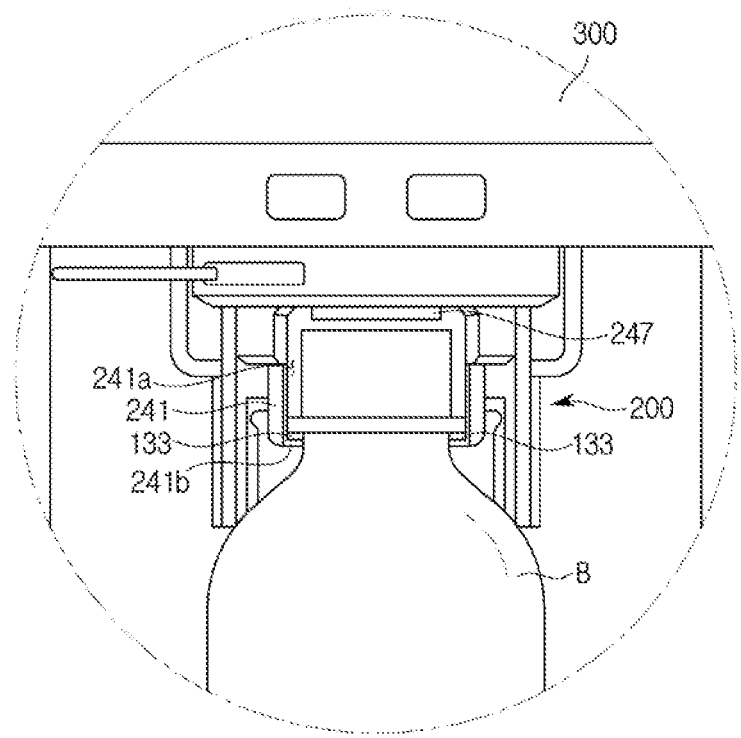
[Fig. 12]
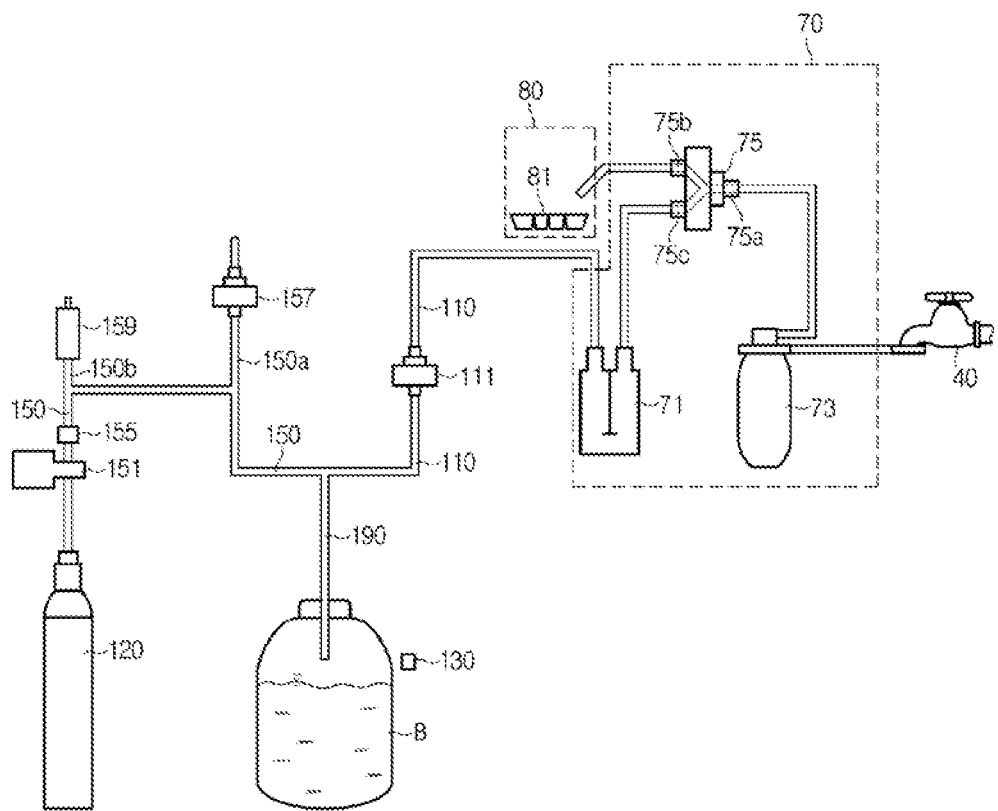

[Fig. 13a]
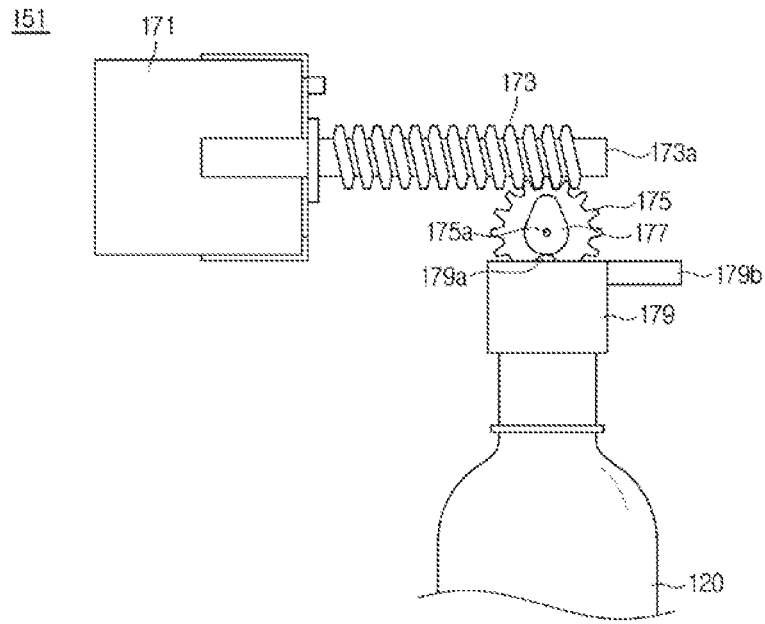
[Fig. 13b]
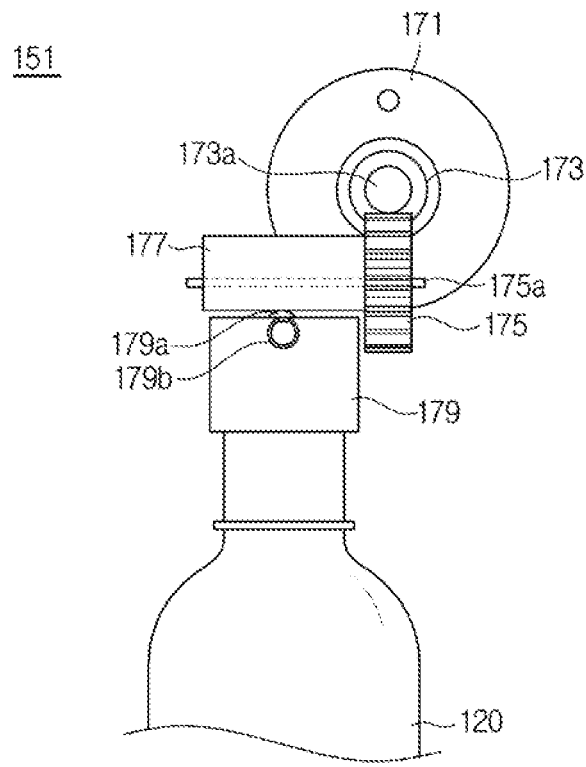

[Fig. 14a]
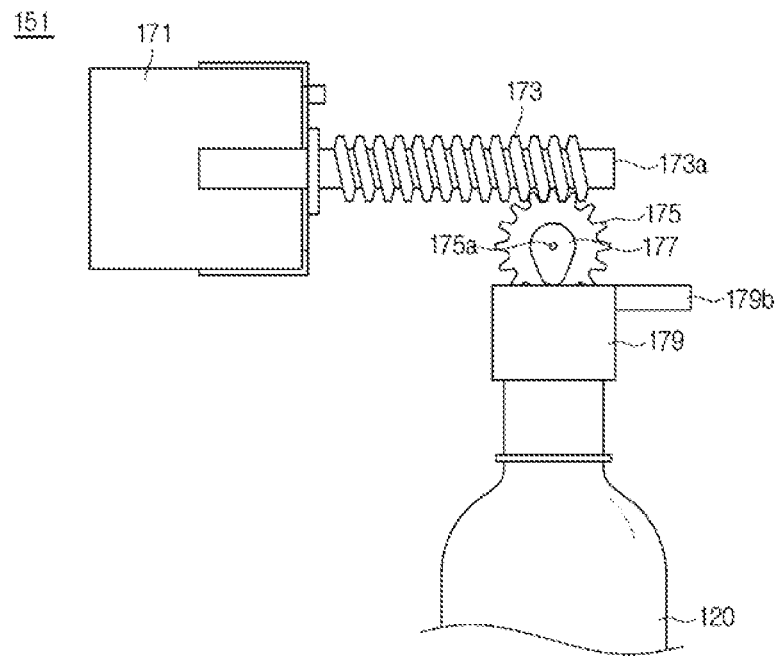
[Fig. 14b]
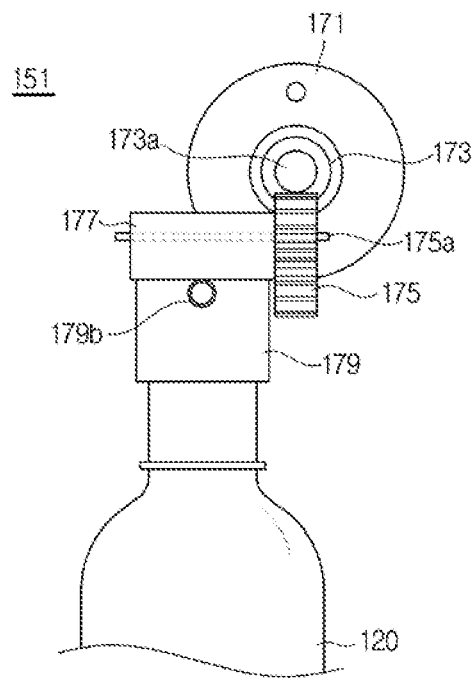

[Fig. 15a]
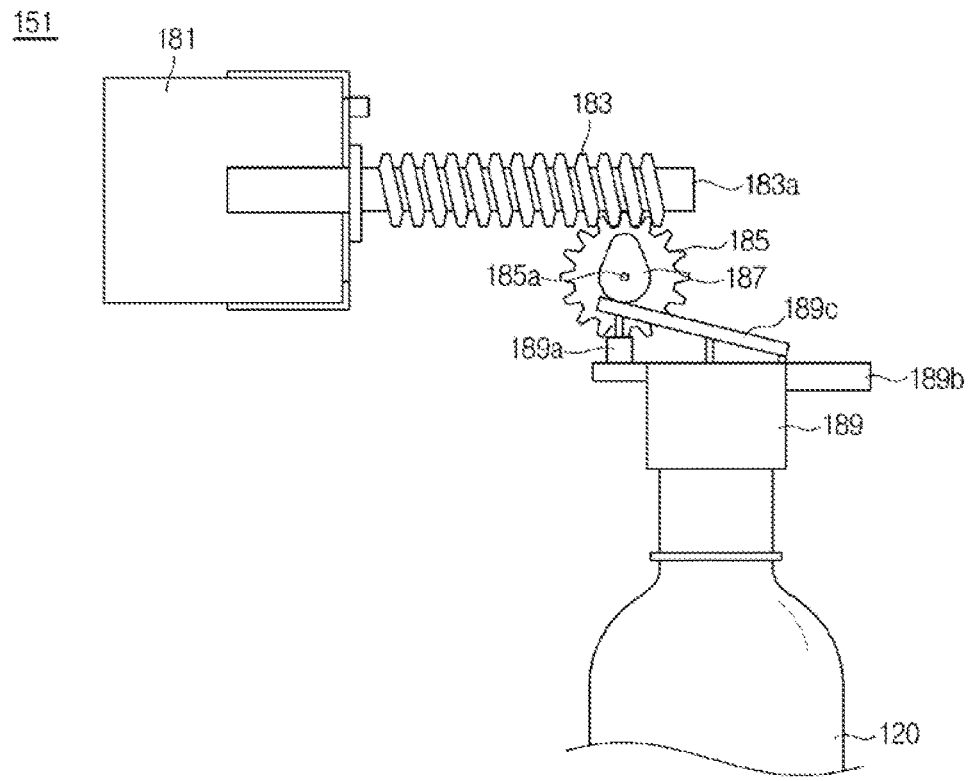
[Fig. 15b]
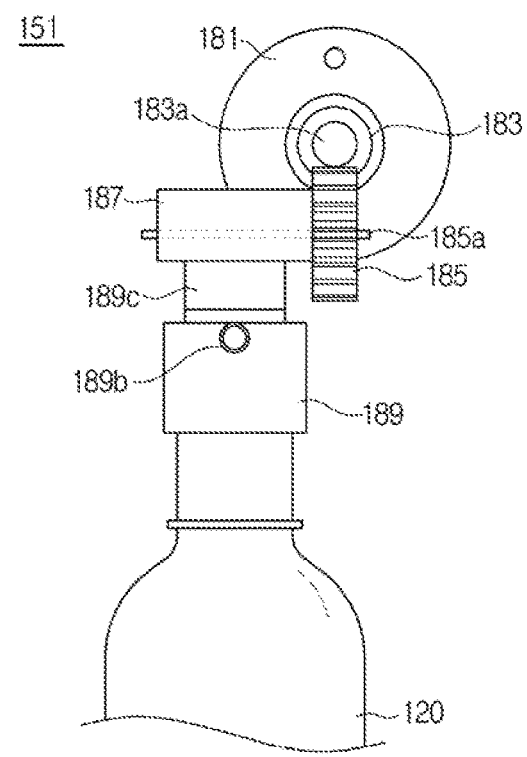

[Fig. 16a]
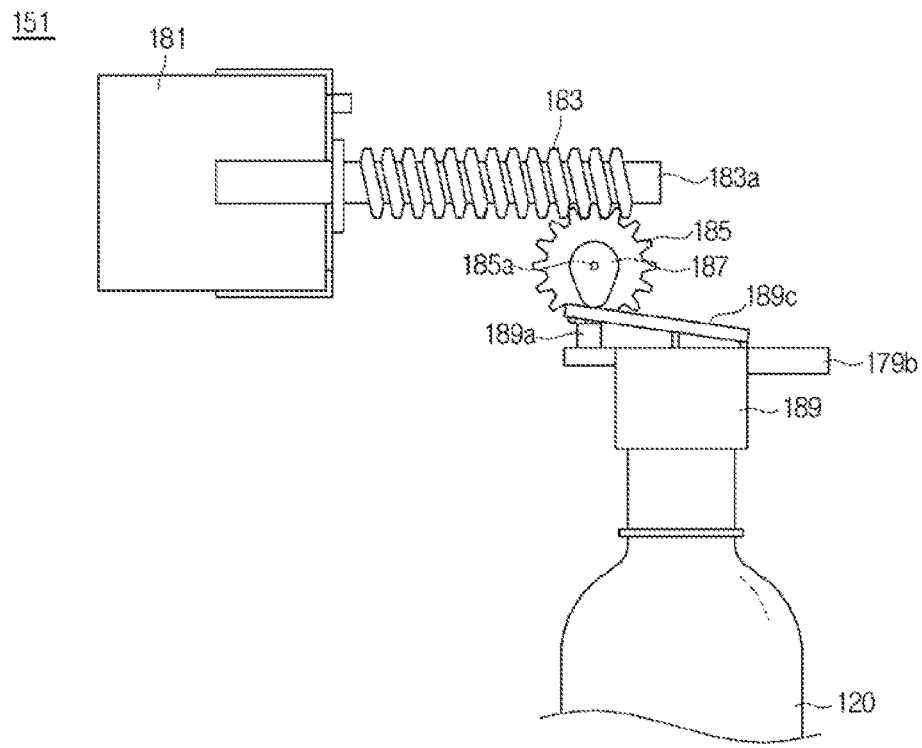
[Fig. 16b]
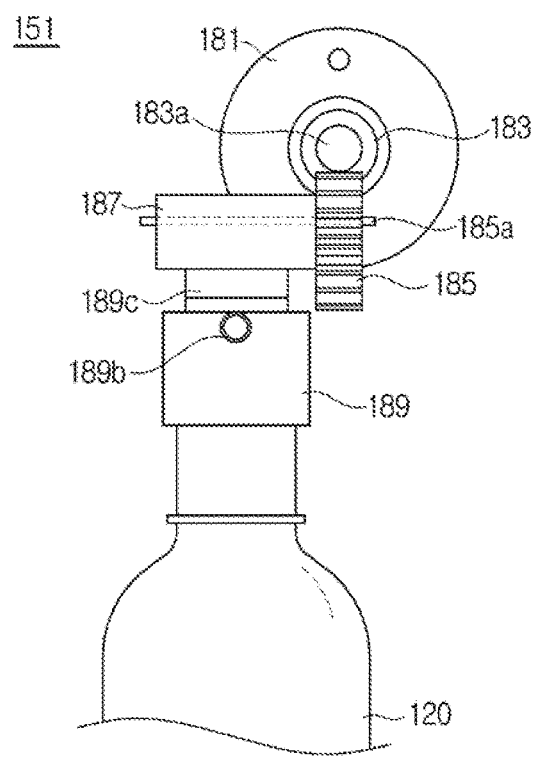

[Fig. 17]
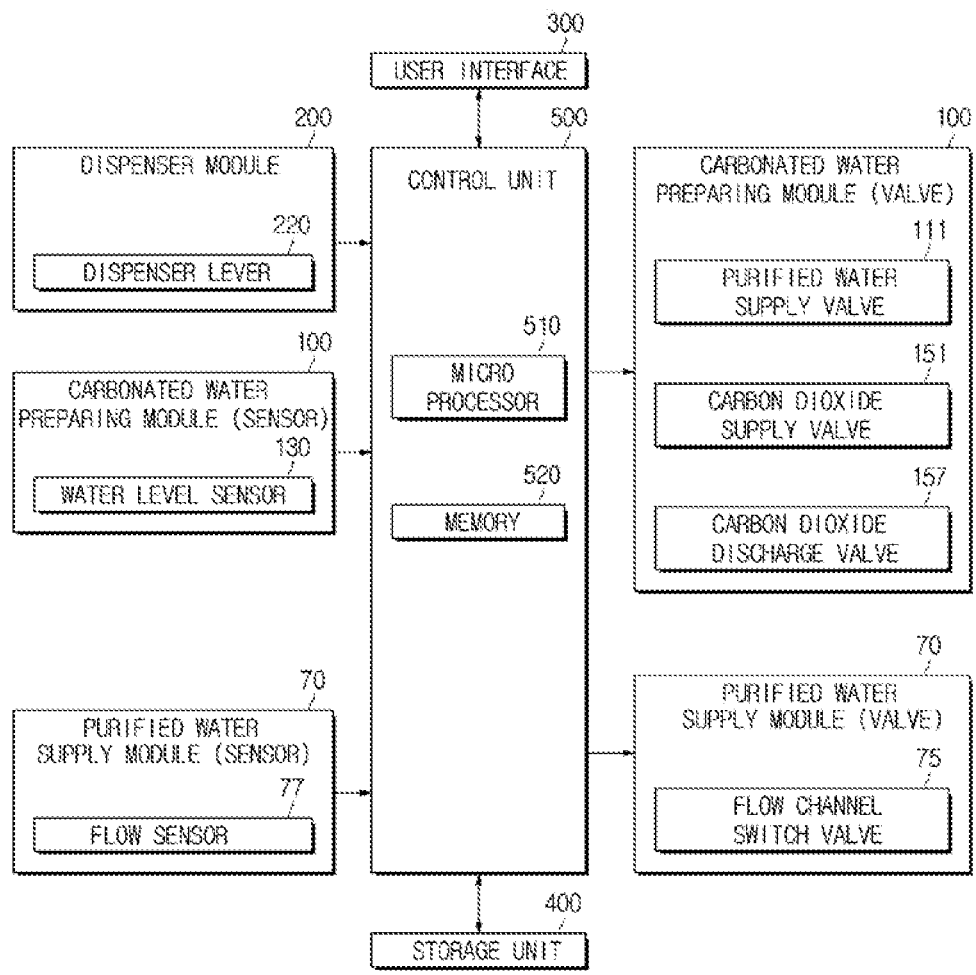
[Fig. 18]
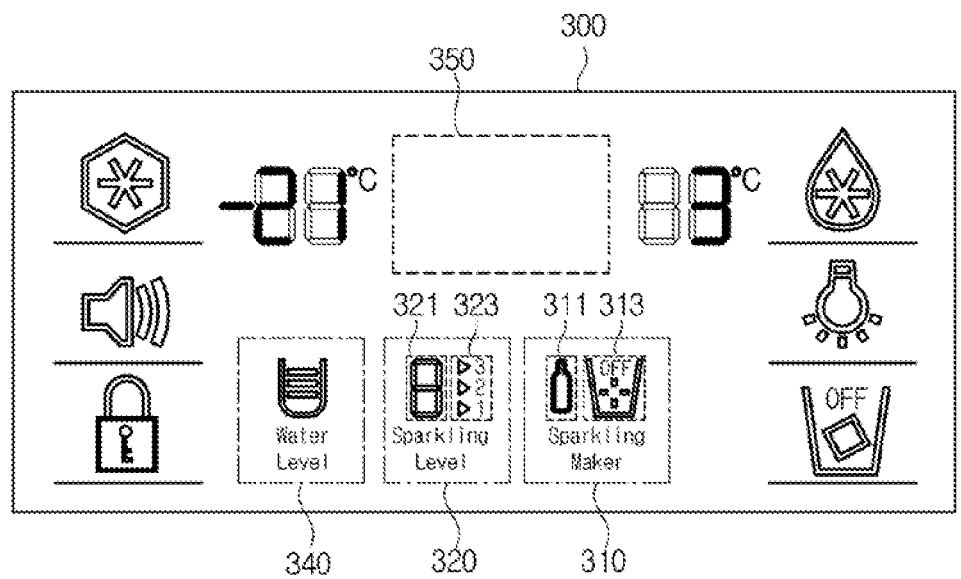

[Fig. 19]
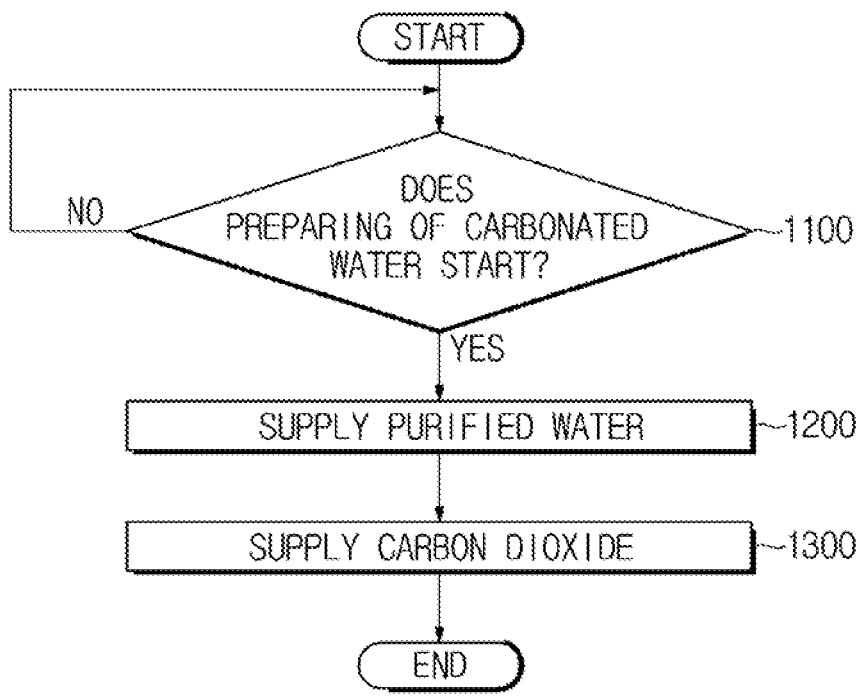
[Fig. 20]
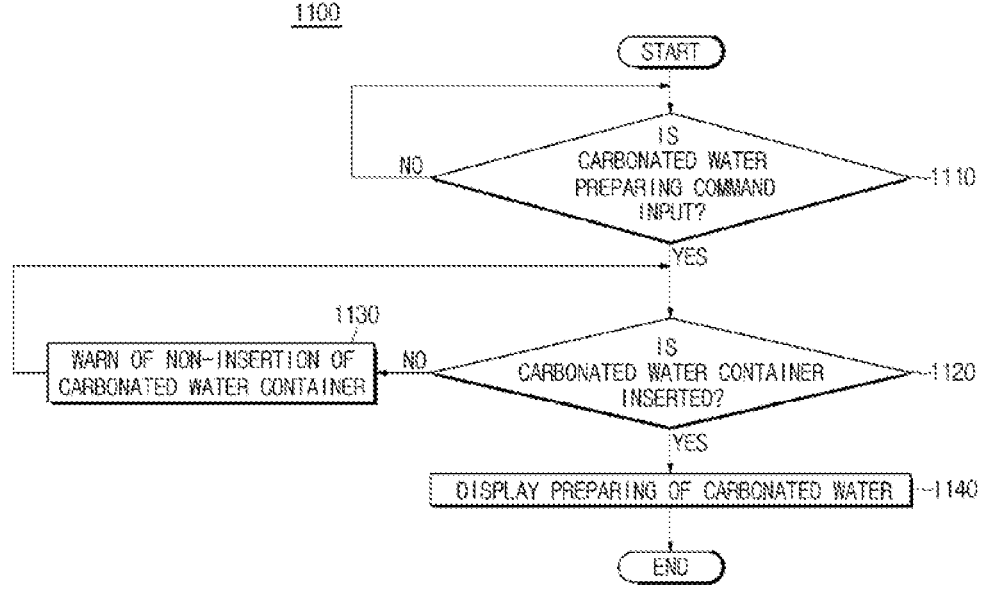

[Fig. 21]
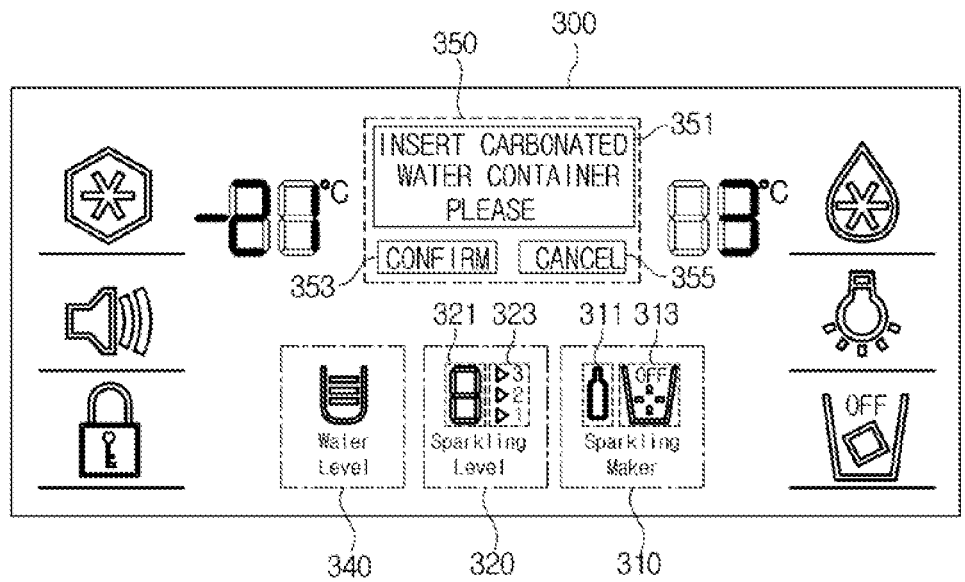
[Fig. 22]
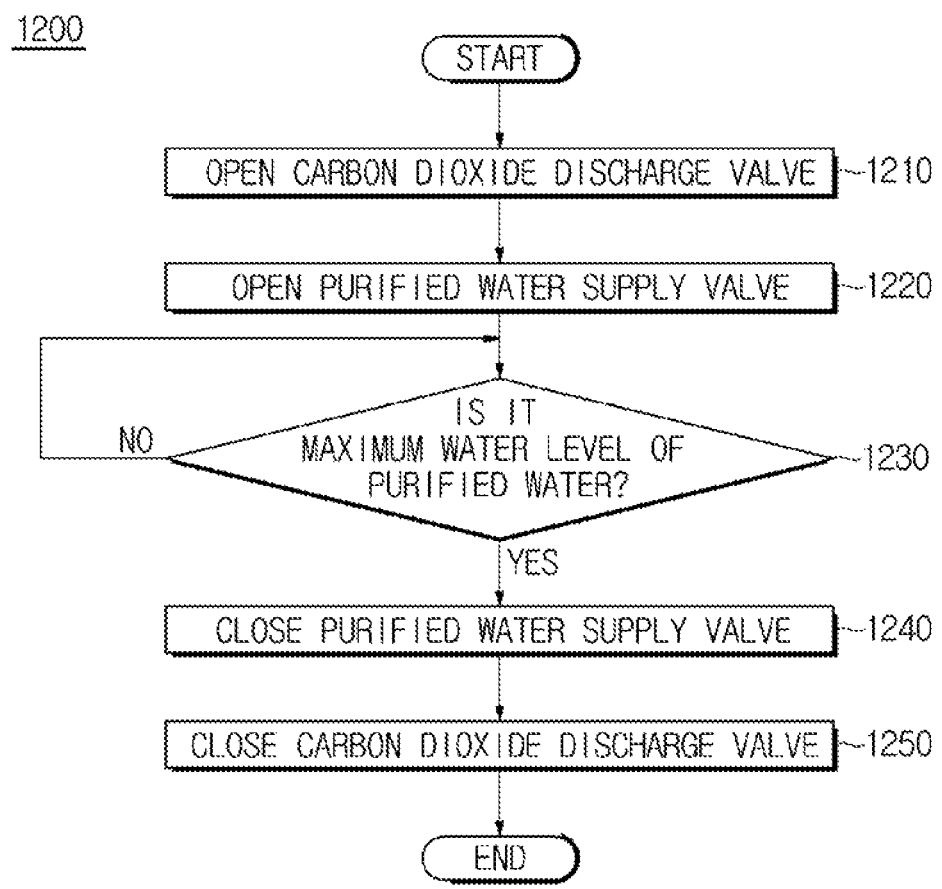

[Fig. 23]
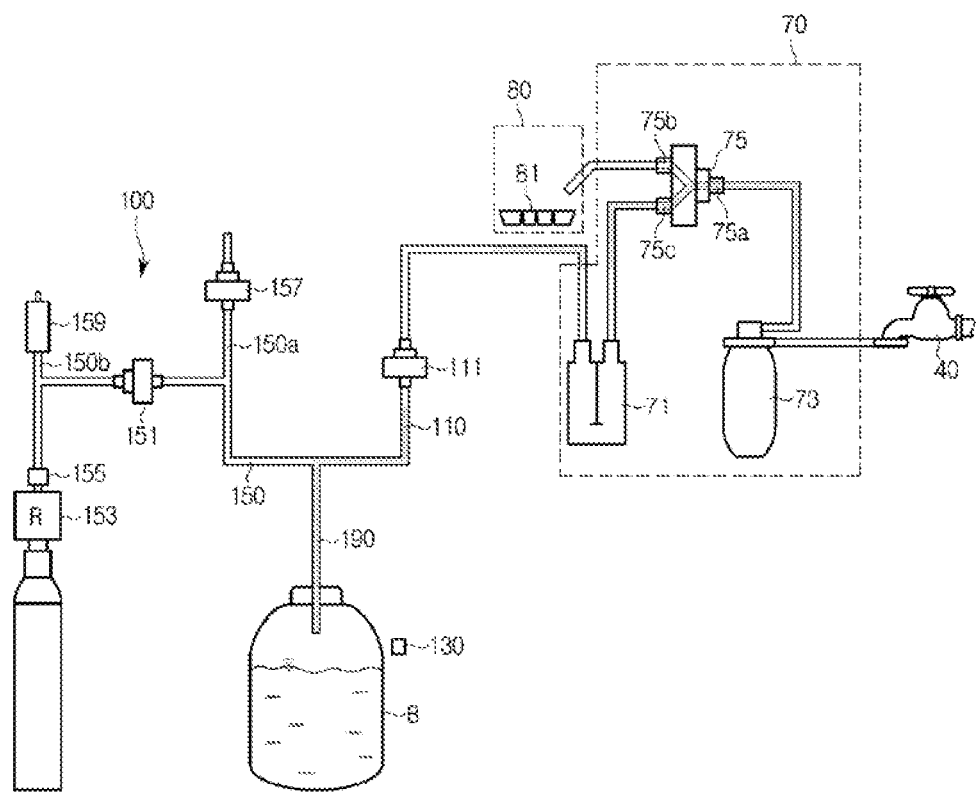

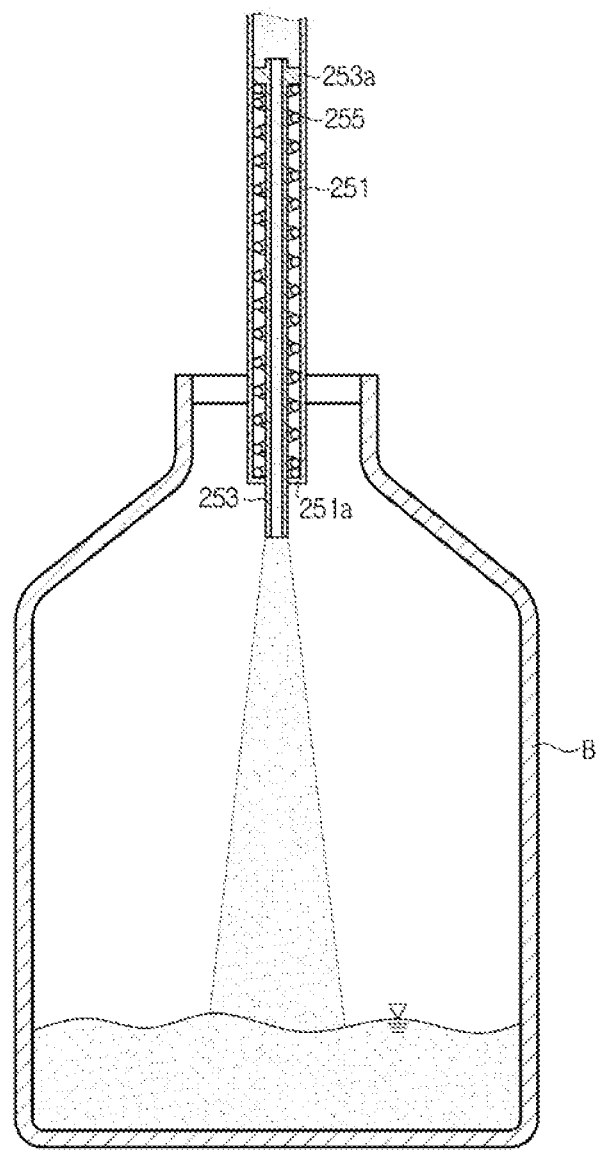
[Fig. 24]

[Fig. 25]
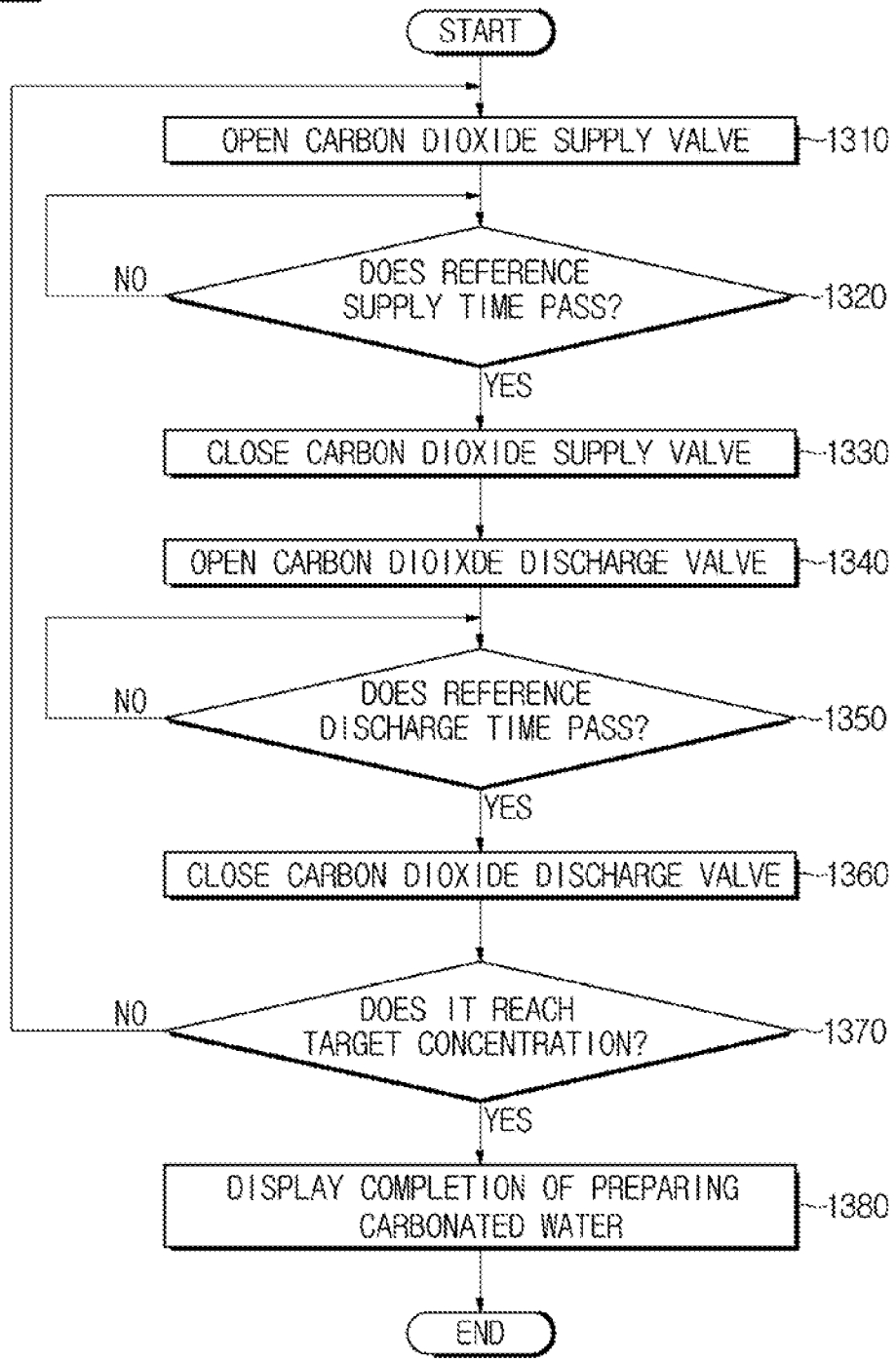

[Fig. 26]
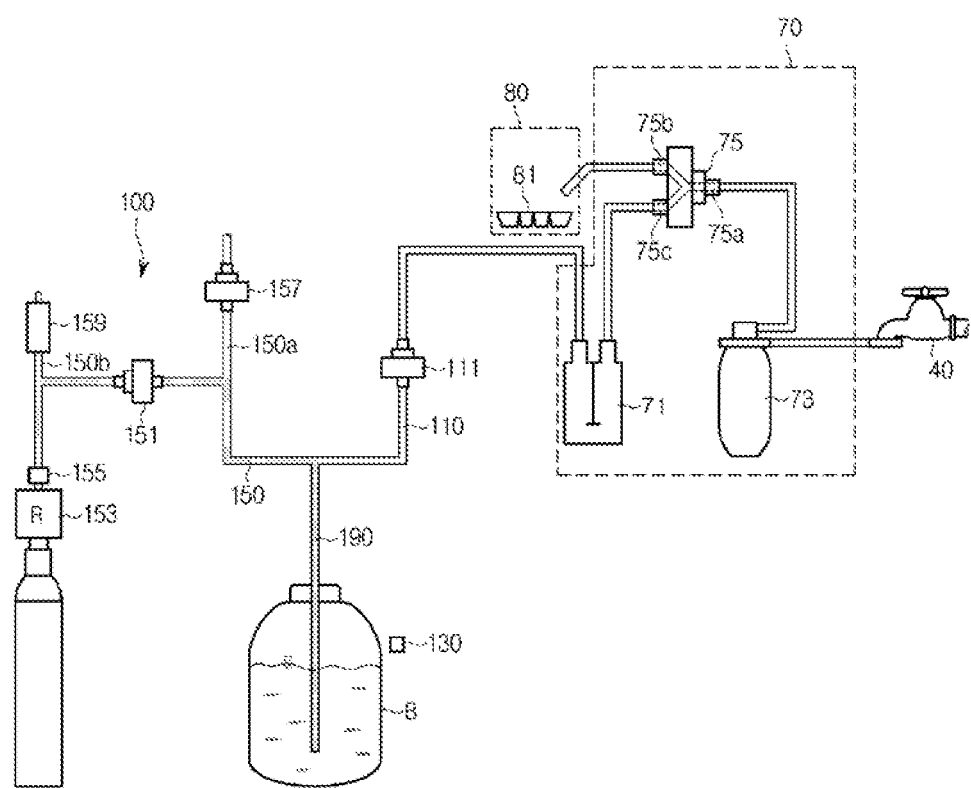

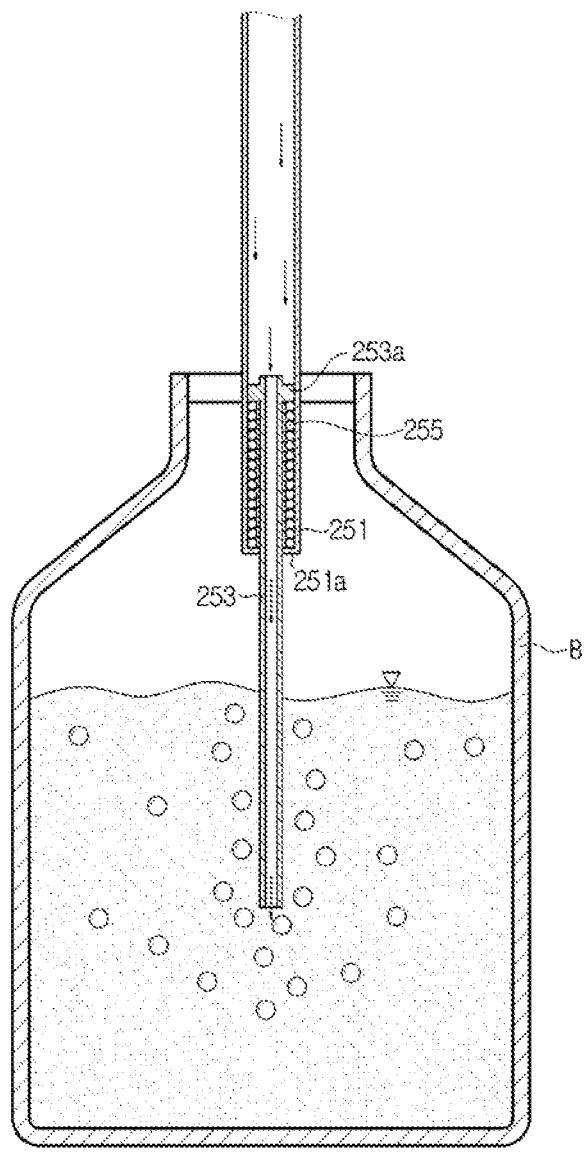
[Fig. 27]

[Fig. 28]
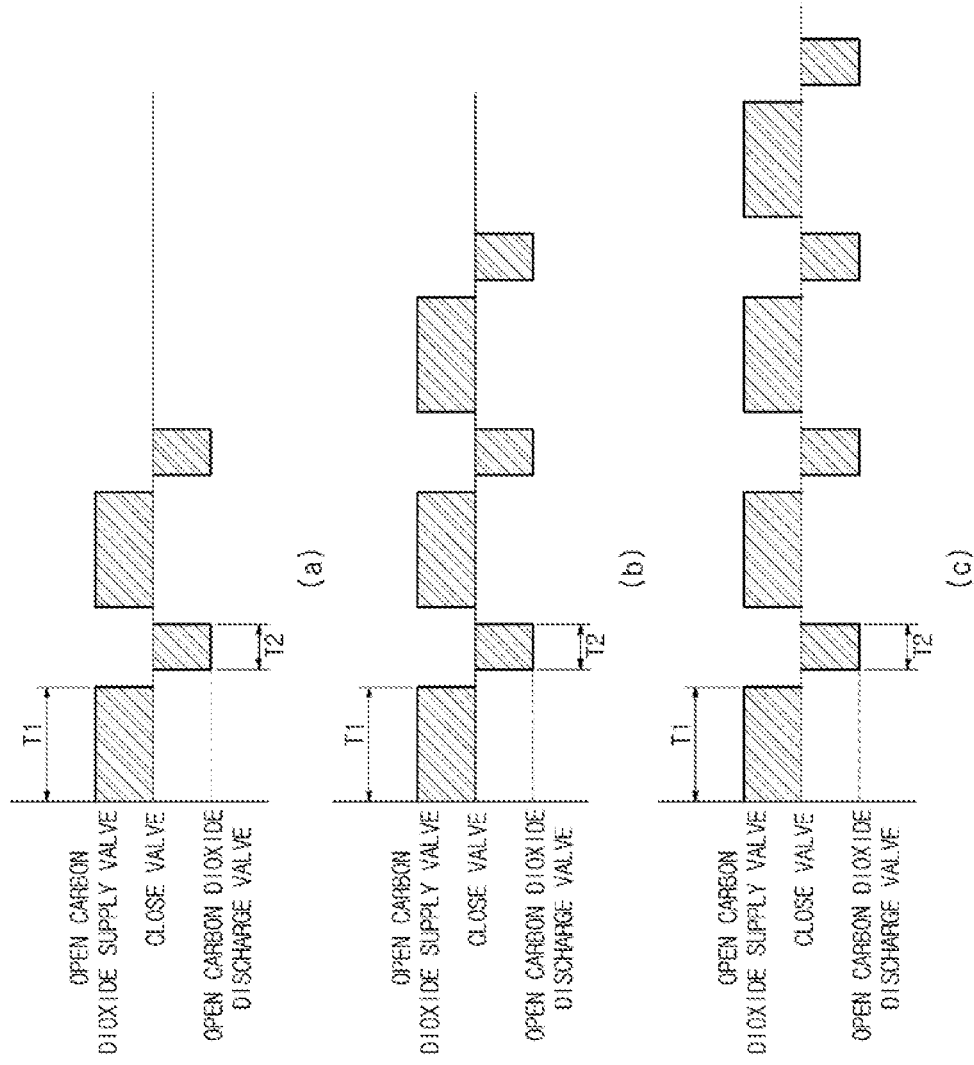

[Fig. 29]
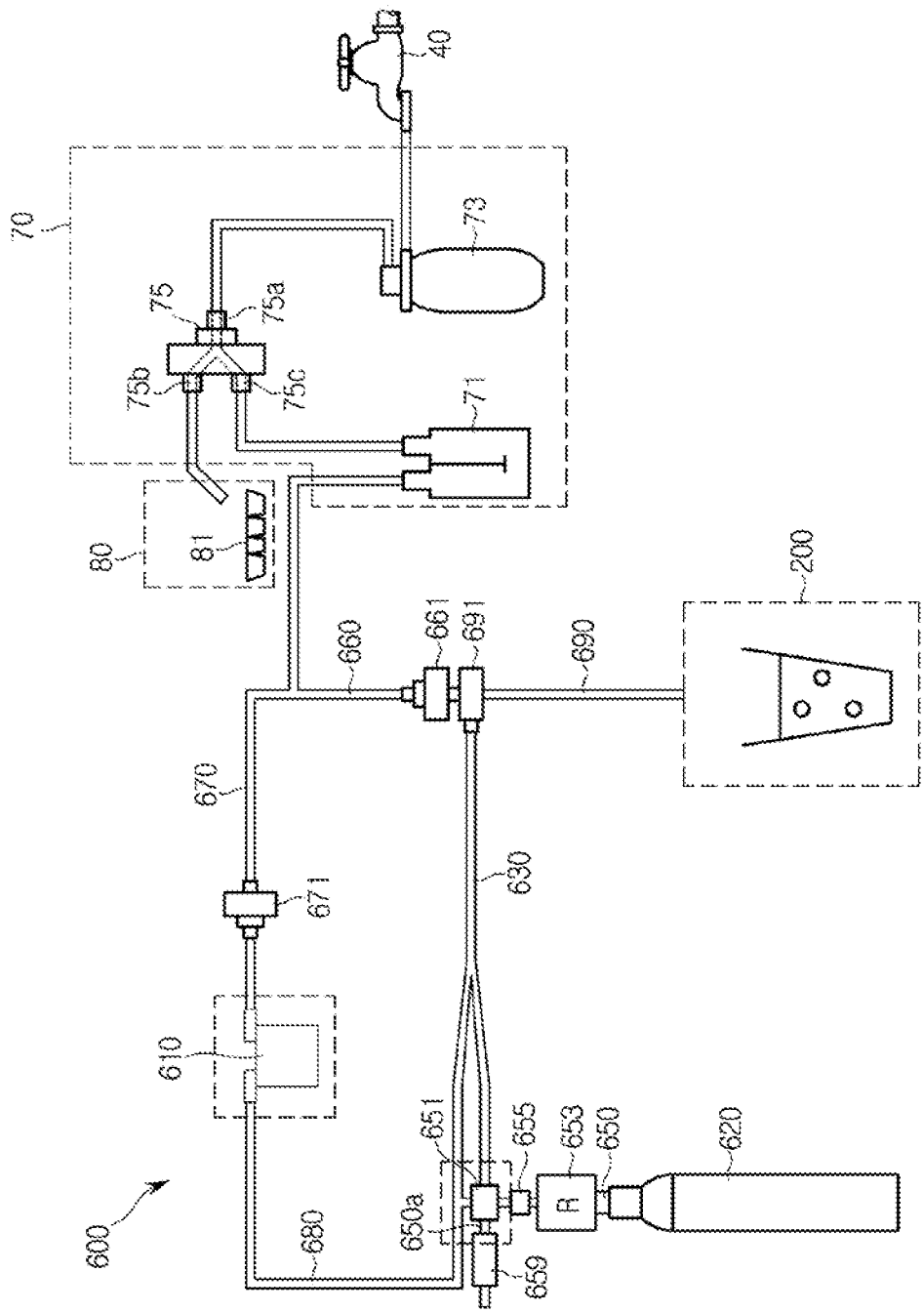

[Fig. 30]
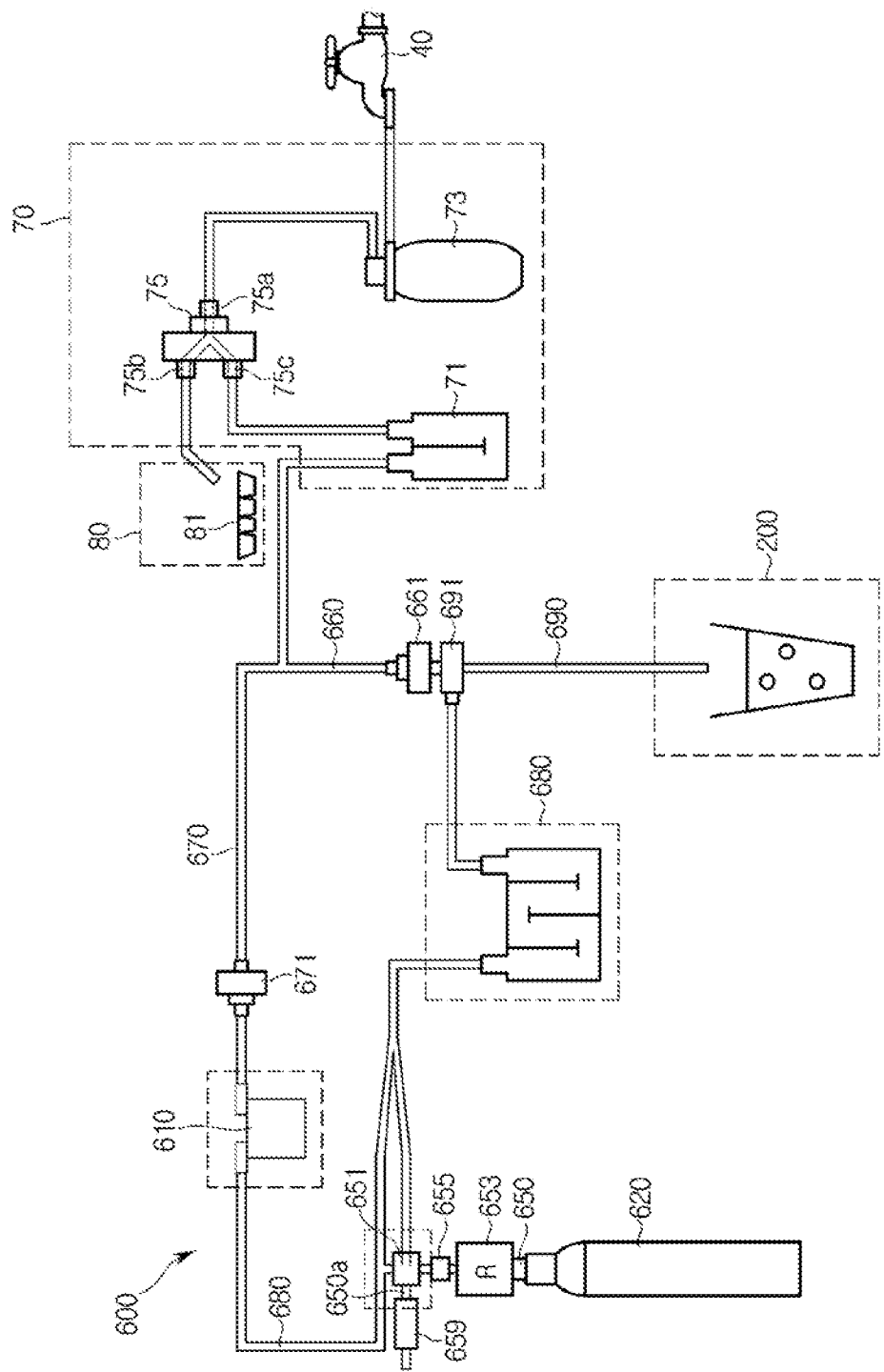

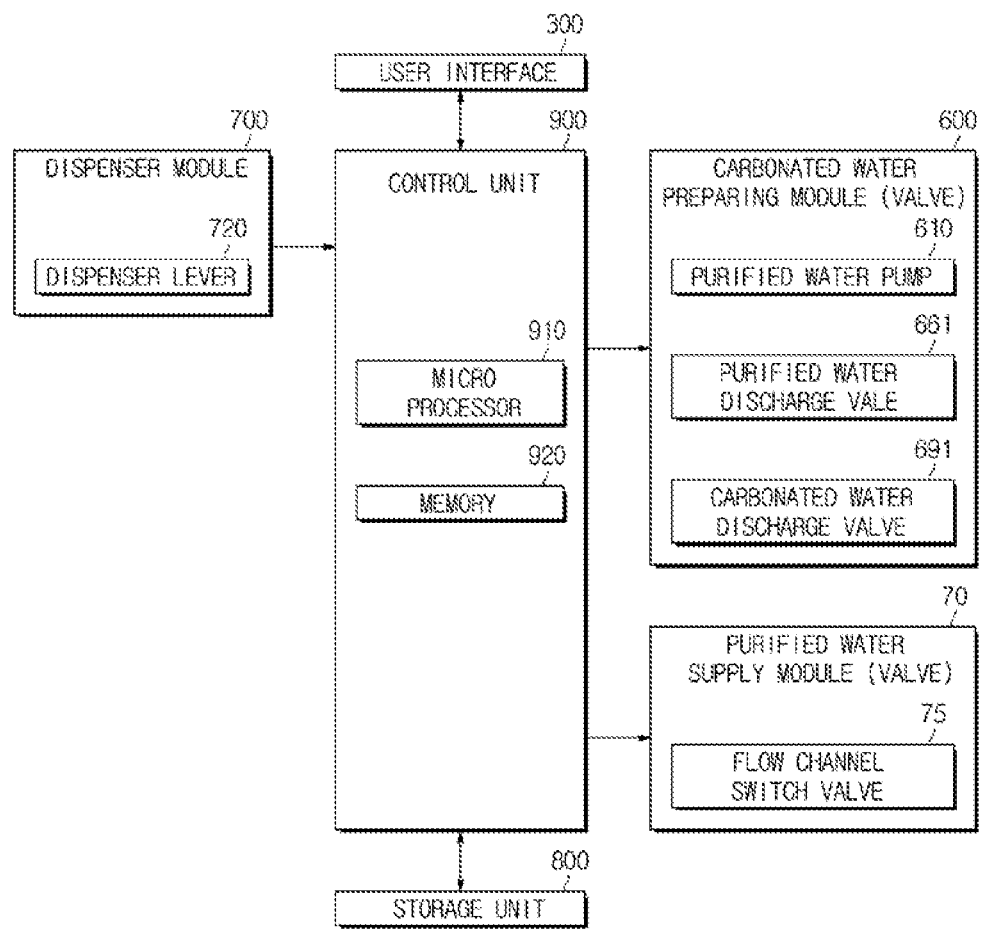
[Fig. 31]

[Fig. 32]
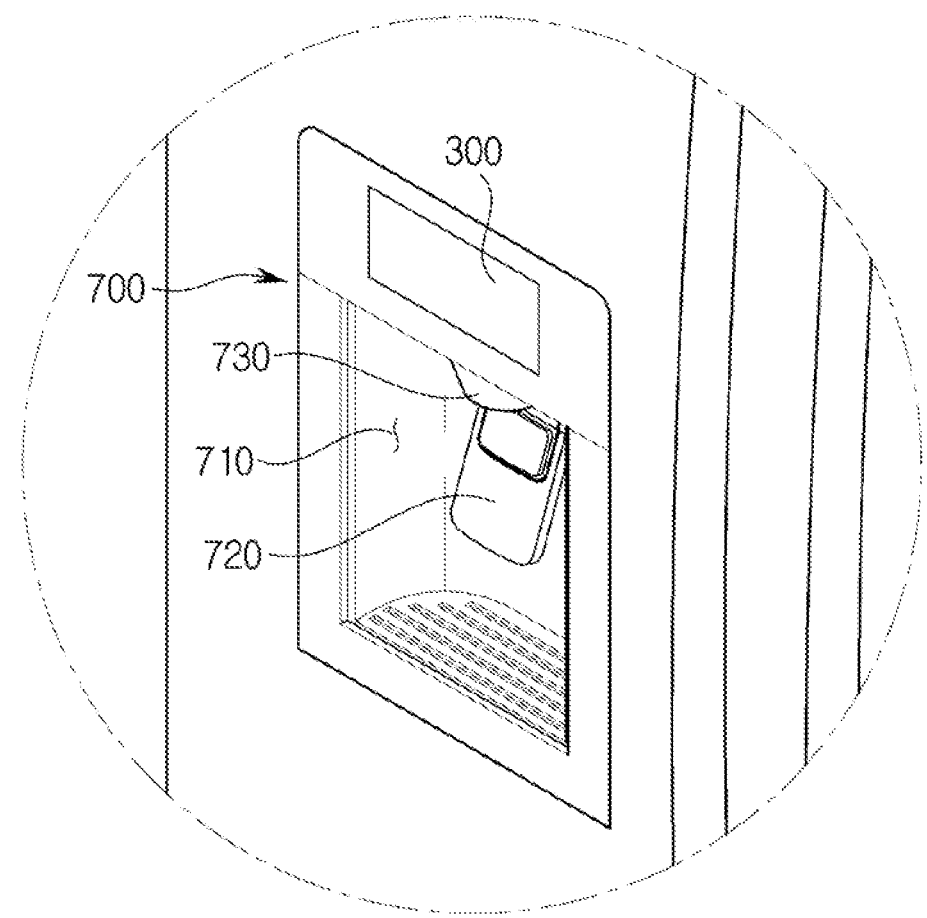

[Fig. 33]
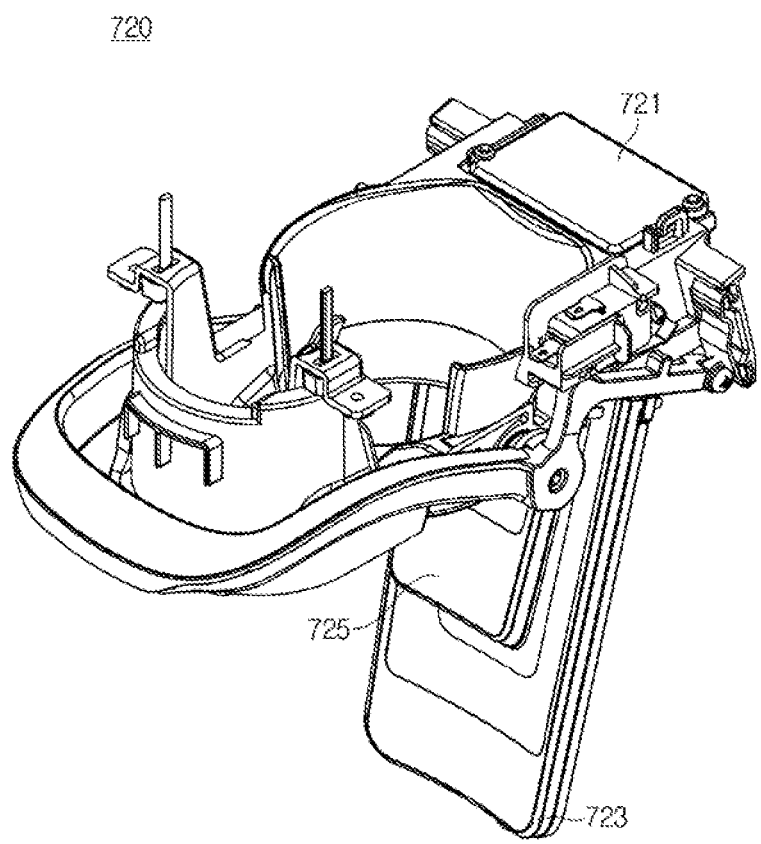

[Fig. 34]
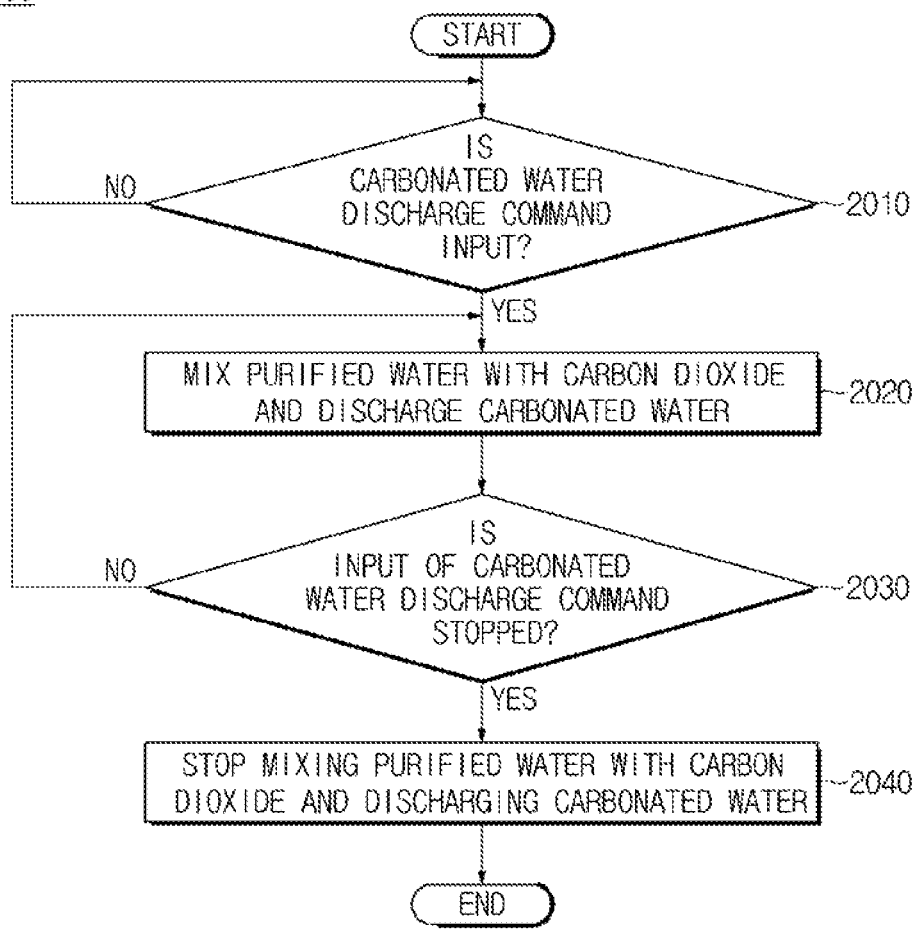

REFRIGERATOR AND CONTROLLING METHOD THEREOF

CROSS-REFERENCE TO RELATED APPLICATIONS

This application is a U.S. National Stage Application, which claims the 5 benefit under 35 U.S.C. § 371 of PCT International Patent Application No. PCT/KR2015/007509, filed Jul. 20, 2015, which claims the foreign priority benefit under 35 U.S.C. § 119 of Korean Patent Application No. 10-2014-0104951, filed Aug. 13, 2014, the contents of which are incorporated herein by reference.

TECHNICAL FIELD

The present disclosure relates to a refrigerator, and more particularly, to a refrigerator capable of preparing carbonated water.

BACKGROUND ART

Generally, refrigerators are home appliances which each include a storage compartment for storing food and a chilly air supply device to keep food fresh. In response to the need of users, refrigerators each may further include an ice making device and a dispenser to allow purified water or ice to be extracted from the outside without opening a door.

There has been a demand of users for being provided with a processed beverage in addition to purified water or ice from refrigerators. However, general refrigerators merely provide users with purified water or ice but can not provide processed beverages.

DISCLOSURE

Technical Problem

It is an aspect of the present disclosure to provide a refrigerator capable of quickly preparing carbonated water according to an operation command of a user and a method of controlling the refrigerator.

Technical Solution

One aspect of the present disclosure provides a refrigerator capable of preparing carbonated water, including a purified water tank which stores water, a carbon dioxide cylinder which stores carbon dioxide, a dispenser module which accommodates an external container and supplies the carbon dioxide and the water to the external container, and a control unit which supplies the water to the external container and supplies the carbon dioxide to the external container when the supplying of the water is completed.

The refrigerator may further include a purified water supply valve which controls the supplying of the water from the purified water tank to the external container and a carbon dioxide supply valve which controls the supplying of the carbon dioxide from the carbon dioxide cylinder to the external container, in which the control unit may open the purified water supply valve to supply the water to the external container and may open the carbon dioxide supply valve to supply the carbon dioxide to the external container.

The control unit may supply the carbon dioxide to the external container and then discharge the carbon dioxide from the external container.

The refrigerator may further include a carbon dioxide discharge valve which controls the discharging of the carbon dioxide from the external container, in which the control unit may open the carbon dioxide discharge valve to discharge the carbon dioxide from the external container.

The control unit may repeat the supplying of the carbon dioxide to the external container and the discharging of the carbon dioxide from the external container.

The refrigerator may further include a user interface which interacts with a user.

The control unit may determine a target supply number of the carbon dioxide according to target concentration input through the user interface.

The control unit may finish the preparing of the carbonated water when the number of supplying and discharging the carbon dioxide reaches the target supply number.

The control unit may finish the preparing of the carbonated water when the number of opening and closing the carbon dioxide supply valve and the carbon dioxide discharge valve reaches a carbon dioxide injection number input through the user interface.

When a preparing command for the carbonated water is input through the user interface, the control unit may determine whether the external container is inserted in the dispenser module.

The control unit may control the user interface to display information related to the insertion of the external container and may receive a confirmation of whether the external container is inserted from a user through the user interface.

The control unit may determine whether the external container is inserted according to a sensing result of a sensor provided in the dispenser module.

When the external container is not inserted, the control unit may control the user interface to display an external container non-insertion message.

Another aspect of the present disclosure provides a refrigerator capable of preparing carbonated water, including a purified water tank which stores water, a carbon dioxide cylinder which stores carbon dioxide, and a dispenser module which accommodates an external container separable from the refrigerator and supplies the carbon dioxide and the water to the external container, in which the dispenser module includes an external container coupling unit coupled with the external container, and a dispenser nozzle through which the water and the carbon dioxide are discharged.

The dispenser nozzle may include a first discharge pipe, a second discharge pipe which is provided inside the first discharge pipe and protrudes from the first discharge pipe when the carbon dioxide is supplied, and an elastic body which returns the second discharge pipe to its original position when the second discharge pipe protrudes from the first discharge pipe.

When the carbon dioxide is supplied, the second discharge pipe may protrude to allow one end thereof to be located below a surface of purified water contained in the external container.

Still another aspect of the present disclosure provides a method of controlling a refrigerator capable of preparing carbonated water, the method including supplying water to an external container separable from the refrigerator and repeating supplying carbon dioxide to the external container and discharging the carbon dioxide from the external container after completing the supplying of the water.

The method may further include receiving target concentration input through a user interface.

The repeating of supplying and discharging of the carbon dioxide may include setting a target supply number of the carbon dioxide according to the target concentration and repeating the supplying and discharging of the carbon dioxide until the number of supplying and discharging the carbon dioxide reaches the target supply number.

The method may further include determining whether the external container is inserted in a dispenser module when a carbonated water preparing command is input through the user interface.

The determining of whether the external container is inserted in the dispenser module may include displaying information related to the insertion of the external container through the user interface and receiving a confirmation of whether the external container is inserted from a user through the user interface.

The determining whether the external container is inserted in the dispenser module may include determining whether the external container is inserted according to a sensing result of a sensor provided in the dispenser module.

The method may further include displaying an external container non-insertion message through the user interface when the external container is not inserted.

Advantageous Effects

According to an aspect of the present disclosure, there are provided a refrigerator capable of quickly preparing carbonated water by repeating supplying and discharging of carbon dioxide after supplying purified water to a carbonated water container and a method of controlling the refrigerator.

According to another aspect of the present disclosure, there are provided a refrigerator capable of quickly preparing carbonated water by supplying purified water and carbon dioxide to a mixing pipe at the same time and a method of controlling the refrigerator.

DESCRIPTION OF DRAWINGS

FIG. 1 illustrates an exterior of a refrigerator according to one embodiment of the present disclosure.

FIG. 2 illustrates an inside of the refrigerator according to one embodiment of the present disclosure.

FIG. 3 illustrates a dispenser lever included in the refrigerator according to one embodiment of the present disclosure.

FIGS. 4a to 4c illustrate an example of a carbonated water container coupling unit included in the refrigerator according to one embodiment of the present disclosure.

FIGS. 5a to 5c illustrate another example of the carbonated water container coupling unit included in the refrigerator according to one embodiment of the present disclosure.

FIGS. 6a and 6b illustrate an example of a dispenser nozzle included in the refrigerator according to one embodiment of the present disclosure.

FIGS. 7a to 7c illustrate another example of the dispenser nozzle included in the refrigerator according to one embodiment of the present disclosure.

FIG. 8 illustrates an example of a carbonated water preparing module and a purified water supply module included in the refrigerator according to one embodiment of the present disclosure.

FIG. 9 illustrates an example of a flow sensor included in the refrigerator according to one embodiment of the present disclosure.

FIG. 10 illustrates an example of a water level sensor included in the refrigerator according to one embodiment of the present disclosure.

FIG. 11 illustrates another example of the water level sensor included in the refrigerator according to one embodiment of the present disclosure.

FIG. 12 illustrates another example of the carbonated water preparing module and the purified water supply module included in the refrigerator according to one embodiment of the present disclosure.

FIGS. 13a, 13b, 14a, and 14b illustrate an example of a carbon dioxide supply valve included in the refrigerator according to one embodiment of the present disclosure.

FIGS. 15a, 15b, 16a, and 16b illustrate another example of the carbon dioxide supply valve included in the refrigerator according to one embodiment of the present disclosure.

FIG. 17 illustrates an example of a flow of a control signal between components included in the refrigerator according to one embodiment of the present disclosure.

FIG. 18 illustrates an example of a user interface included in the refrigerator according to one embodiment of the present disclosure.

FIG. 19 illustrates an example of a method of preparing carbonated water in which the refrigerator prepares the carbonated water according to one embodiment of the present disclosure.

FIG. 20 illustrates an example of the method of preparing carbonated water in which the refrigerator determines whether to prepare the carbonated water according to one embodiment of the present disclosure.

FIG. 21 illustrates an example in which the refrigerator determines whether a carbonated water container is inserted according to one embodiment of the present disclosure.

FIG. 22 illustrates an example of a method of supplying purified water in which the refrigerator supplies the purified water to the carbonated water container according to one embodiment of the present disclosure.

FIGS. 23 and 24 illustrate an example in which the refrigerator supplies the purified water to the carbonated water container according to one embodiment of the present disclosure.

FIG. 25 illustrates an example of a method of supplying carbon dioxide in which the refrigerator supplies the carbon dioxide to the carbonated water container according to one embodiment of the present disclosure.

FIGS. 26 and 27 illustrate an example in which the refrigerator supplies the carbon dioxide to the carbonated water container according to one embodiment of the present disclosure.

FIG. 28 illustrates an example in which the refrigerator controls the concentration of the carbonated water according to one embodiment of the present disclosure.

FIG. 29 illustrates still another example of the carbonated water preparing module and the purified water supply module included in the refrigerator according to one embodiment of the present disclosure.

FIG. 30 illustrates yet another example of the carbonated water preparing module and the purified water supply module included in the refrigerator according to one embodiment of the present disclosure.

FIG. 31 illustrates another example of the flow of the control signal between the components included in the refrigerator according to one embodiment of the present disclosure.

FIGS. 32 and 33 illustrate another example of a dispenser module included in the refrigerator according to one embodiment of the present disclosure.

FIG. 34 illustrates another example of the method of preparing carbonated water in which the refrigerator prepares the carbonated water according to one embodiment of the present disclosure.

BEST MODE

Embodiments described herein and configurations shown in the drawings are merely exemplary examples. Also, various modifications which are able to replace the embodiments and the drawings may be present at a point in time of filing the present application.

Hereinafter, one embodiment of the present disclosure will be described in detail with reference to the attached drawings.

FIG. 1 illustrates an exterior of a refrigerator according to one embodiment of the present disclosure. FIG. 2 illustrates an inside of the refrigerator according to one embodiment of the present disclosure.

As shown in FIGS. 1 and 2, the refrigerator 1 may include a body 10, storage compartments 20 and 30 provided inside the body 10, and a chilly air supply device (not shown) which supplies chilly air to the storage compartments 20 and 30.

The body 10 may include an inner casing forming the storage compartments 20 and 30, an outer casing coupled with the outside of the inner casing to form an exterior of the refrigerator 1 and an insulator disposed between the inner casing and the outer casing to insulate the storage compartments 20 and 30 from the outside.

The storage compartments 20 and 30 may be divided into a refrigeration compartment 20 on top and a freezing compartment 30 below by an intermediate partition 11. The refrigeration compartment 20 may be maintained at a temperature of about three degrees above zero to store food under refrigeration. The freezing compartment 30 may be maintained at a temperature of about 18.5 degrees below zero to store food frozen.

In the above, the refrigeration compartment 20 and the freezing compartment 30 divided top and bottom have been described but are not limited thereto. The refrigeration compartment 20 and the freezing compartment 30 may be divided left and right by the intermediate partition 11.

The refrigeration compartment 20 may include a shelf 23 for allowing food to be put thereon and at least one storage box 27 for airtightly storing food.

Also, the refrigeration compartment 20 may include a purified water supply module 70 which purifies and stores water. The purified water supply module 70 may include a water purification filter 73 which purifies water supplied from a water source and a purified water tank 71 which stores purified water.

Also, the purified water supply module 70, as shown in FIG. 2, may be provided between the storage boxes 27 but is not limited thereto. It will be satisfied when the purified water supply module 70 is provided merely inside the refrigeration compartment 20 to cool the water of the purified water supply module 70.

A detailed configuration of the purified water supply module 70 will be described below in detail with reference to FIGS. 5 and 6.

Also, an ice-making chamber 80 capable of making ice may be formed in an upper corner of the refrigeration compartment 20 while being separate from the refrigeration compartment 20. An ice-making device 81 which makes/stores ice may be provided inside the ice-making chamber 80. The ice-making device 81 may include an ice-making tray which makes ice using the water supplied from a purified water tank 71 and an ice bucket which stores the ice made by the ice-making tray.

The refrigeration compartment 20 and the freezing compartment 30 have open front to front-load food, respectively. The open front of the refrigeration compartment 20 may be open and closed by a pair of rotating doors 21 and 22 coupled with the body 10 using hinges. The open front of the freezing compartment 30 may be open and closed by a sliding door 31 capable of slidably moving toward the body 10.

Door guards 24 capable of containing food may be provided in rear sides of the refrigeration compartment doors 21 and 22, respectively. Gaskets 28 which seal gaps between the refrigeration compartment doors 21 and 22 and the body 10 to keep chilly air inside the refrigeration compartment 20 when the refrigeration compartment doors 21 and 22 are closed may be provided at edge portions of the rear sides of the refrigeration compartment doors 21 and 22.

Also, one of the refrigeration compartment doors 21 and 22, for example, the refrigeration compartment door 21 may selectively include a rotating bar 26 which seals a gap between the refrigeration compartment door 21 and the refrigeration compartment door 22 to keep the chilly air inside the refrigeration compartment 20 when the refrigeration compartment doors 21 and 22 are closed.

Also, one of the refrigeration compartment doors 21 and 22, for example, the refrigeration compartment door 21 may include a dispenser module 200 which allows purified water, carbonated water, or ice to be extracted without opening the refrigeration compartment door 21 and a user interface 300 which receives a control command related to an operation of the refrigerator 1 and displays operation information of the refrigerator 1.

A user may insert a container such as a cup or bottle in a water dispensing space 210 provided in the dispenser module 200 and may extract purified water, carbonated water, or ice. For example, the user inserts the cup in the water dispensing space 210 and extracts the purified water or ice.

Particularly, the user may couple the dispenser module 200 with a carbonated water container B and may be provided with the carbonated water in the carbonated water container B by the refrigerator 1. A detailed configuration and operation of the dispenser module 200 will be described below.

The user interface 300 may include a touch switch which receives various control commands with respect to the refrigerator 1 from the user and a display which displays the operation information of the refrigerator 1 to the user.

The user interface 300 may receive a target temperature of the refrigeration compartment 20, a target temperature of the freezing compartment 30, a carbonated water preparing command, target concentration of carbonated water, etc. from the user and may display a present temperature of the refrigeration compartment 20, a present temperature of the freezing compartment 30, whether to prepare carbonated water, and a concentration of the prepared carbonated water in response to the control command of the user. A detailed configuration and operation of the user interface 300 will be described below.

A carbonated water preparing module 100 which prepares the carbonated water may be mounted in the rear side of the refrigeration compartment door 21 in which the dispenser module 200 of the refrigerator 1 is provided. A detailed configuration and operation of the carbonated water preparing module 100 will be described below.

The refrigerator 1 shown in FIGS. 1 and 2 is merely an example and is not limited thereto.

First, the dispenser module 200 will be described.

FIG. 3 illustrates a dispenser lever included in the refrigerator according to one embodiment of the present disclosure.

Also, FIGS. 4a to 4c illustrate an example of a carbonated water container coupling unit included in the refrigerator according to one embodiment of the present disclosure. FIGS. 5a to 5c illustrate another example of the carbonated water container coupling unit included in the refrigerator according to one embodiment of the present disclosure.

Also, FIGS. 6a and 6b illustrate an example of a dispenser nozzle included in the refrigerator according to one embodiment of the present disclosure. FIGS. 7a to 7c illustrate another example of the dispenser nozzle included in the refrigerator according to one embodiment of the present disclosure.

As shown in FIGS. 3 to 7c, the dispenser module 200 may include the dispenser lever 220 which inputs a discharge command for purified water or ice, the carbonated water container coupling unit 230 or 240 coupled with the carbonated water container B, and the dispenser nozzle 250 or 260 through which the purified water or carbon dioxide is discharged.

As shown in FIG. 3, the dispenser lever 220 may include a dispenser lever body 221, a first dispenser lever 223, and a second dispenser lever 225.

The first dispenser lever 223 is formed to extend downward from the dispenser lever body 221. Also, the first dispenser lever 223 may pivot forward and backward on a pivot provided in the dispenser lever body 221.

In detail, the first dispenser lever 223 pivots backward due to an external force. When the external force is removed, the first dispenser lever 223 returns to a forward position due to an elastic member.

The user may pressurize the first dispenser lever 223 to be provided with the purified water from the refrigerator 1. While the first dispenser lever 223 is being pressurized, the refrigerator 1 discharges the purified water through the dispenser module 200.

When an appropriate amount of the purified water is discharged, to stop discharging the purified water, the pressurization of the first dispenser lever 223 may be released. When the pressurization of the first dispenser lever 223 is released, the refrigerator 1 stops discharging the purified water.

The second dispenser lever 225 may be formed to extend downward from the dispenser lever body 221 and may be located in front of the first dispenser lever 223 described above. Also, the second dispenser lever 225 may pivot forward and backward on a pivot provided in the dispenser lever body 221.

In detail, the second dispenser lever 225 pivots backward due to an external force. When the external force is removed, the second dispenser lever 225 returns to a forward position due to an elastic member.

The user may pressurize the second dispenser lever 225 to be provided with the ice from the refrigerator 1. While the second dispenser lever 225 is being pressurized, the refrigerator 1 may continuously discharge the ice through the dispenser module 200.

When an appropriate amount of the ice is discharged, to stop discharging of the ice of the refrigerator 1, the pressurization of the second dispenser lever 225 may be released. When the pressurization of the second dispenser lever 225 is released, the refrigerator 1 stops discharging the ice.

The carbonated water container coupling unit 230 or 240 may be coupled with the carbonated water container B in various ways.

For example, the carbonated water container coupling unit 230 or 240 may be coupled with the carbonated water container B by moving the carbonated water container B.

In detail, as shown in FIGS. 4a to 4c, the carbonated water container coupling unit 230 may include a mounting member 231 on which the carbonated water container B is mounted, a detachable lever 233 pivoting up and down, a connecting member 235 which moves the mounting member 231 up and down according to the rotating movement of the detachable lever 233, and a coupling member 237 fixed to the refrigeration compartment door 21 to be coupled with the carbonated water container B.

The mounting member 231 accommodates the carbonated water container B.

Inside the mounting member 231, a container mounting space 231a in which an inlet of the carbonated water container B is mounted is formed. The user may insert the carbonated water container B in the container mounting space 231a to mount therein.

Also, on a bottom of the mounting member 231, a container holding protrusion 231b which fixes the carbonated water container B to the mounting member 231 is formed. The container holding protrusion 231b prevents the carbonated water container B from being separated from the container mounting space 231a when the carbonated water container B is inserted into the container mounting space 231a.

Also, the mounting member 231 includes a mounting member protrusion 231c formed to protrude outward. The mounting member protrusion 231c is coupled with the connecting member 235 which will be described below and receives a lifting force from the connecting member 235.

The detachable lever 233 is provided to protrude forward and may pivot up and down on a detachable lever pivot 233a.

Also, the detachable lever 233 includes a detachable lever protrusion 233b formed to protrude outward. The detachable lever protrusion 233b is coupled with the connecting member 235 which will be described below and transfers a pivoting motion force of the detachable lever 233 to the connecting member 235.

The connecting member 235 may be installed in the rear of the detachable lever 233 and the mounting member 231 and is connected to the detachable lever 233 and the mounting member 231. The connecting member 235 converts the pivoting motion force of the detachable lever 233 into a reciprocating motion force and transfers the reciprocating motion force to the mounting member 231.

A first connecting groove 235a coupled with the detachable lever 233 is provided on one side of the connecting member 235, and a second connecting groove 235b coupled with the mounting member 231 is provided on the other side of the connecting member 235.

The connecting member 235 is rotatably coupled with the detachable lever 233 through the first connecting groove 235a. In detail, the detachable lever protrusion 233b of the detachable lever 233 is inserted into the first connecting groove 235a.

Also, the connecting member 235 is rotatably coupled with the mounting member 231 through the second connecting groove 235b. In detail, the mounting member protrusion 231c of the mounting member 231 is inserted into the second connecting groove 235b.

The coupling member 237 is fixedly provided in the refrigeration compartment door 21 and is coupled with the carbonated water container B. In detail, the coupling member 237 is coupled with the inlet of the carbonated water container B according to the pivoting of the detachable lever 233 to seal the inlet of the carbonated water container B.

As described above, the detachable lever 233 may pivot on the detachable lever pivot 233a along a first moving path D1.

While the detachable lever 233 is pivoting along the first moving path D1, the detachable lever protrusion 233b pivots along a second moving path D2 and the first connecting groove 235a coupled with the detachable lever protrusion 233b moves together with the detachable lever protrusion 233b along the second moving path D2.

Also, while the first connecting groove 235a is moving along the second moving path D2, the second connecting groove 235b provided on the other side of the connecting member moves upward along a third path D3 and the mounting member 231 moves upward together with the second connecting groove 235b along the third path D3.

As a result of the upward movement of the mounting member 231 along the third path D3, the carbonated water container B is coupled with the coupling member 237 and sealed by the coupling member 237.

As described above, as an example, the carbonated water container coupling unit 230 is coupled with the carbonated water container B by moving the carbonated water container B.

As another example, the carbonated water container coupling unit 230 or 240 may move to be coupled with the carbonated water container B.

In detail, as shown in FIGS. 5a to 5c, the carbonated water container coupling unit 240 may include a mounting member 241 fixed to the refrigeration compartment door 21, on which the carbonated water container B is mounted, a coupling member 247 coupled with the carbonated water container B, a detachable lever 243 pivoting up and down, a connecting member 245 which moves the coupling member 247 up and down according to the pivoting of the detachable lever 243.

The mounting member 241 may accommodate the carbonated water container B and may be fixed to the refrigeration compartment door 21.

Inside the mounting member 241, a container mounting space 241a in which the inlet of the carbonated water container B is mounted is formed. The user may insert the carbonated water container B in the container mounting space 241a to mount therein.

Also, on a bottom of the mounting member 241, a container holding protrusion 241b which fixes the carbonated water container B to the mounting member 241 is formed. The container holding protrusion 241b prevents the carbonated water container B from being separated from the container mounting space 241a when the carbonated water container B is inserted into the container mounting space 241a.

Also, the mounting member 241 includes a mounting member protrusion 241c formed to protrude outward. The mounting member protrusion 241c is coupled with the detachable lever 243 which will be described below.

The detachable lever 243 is provided to protrude forward and is coupled with the mounting member 241. Also, the detachable lever 243 may pivot up and down on a detachable lever pivot 243a.

The detachable lever 243 may use the mounting member protrusion 241c described above as the detachable lever pivot 243a. In other words, the detachable lever 243 may pivot on the mounting member protrusion 241c.

The coupling member 247 is coupled with the carbonated water container B. In detail, the coupling member 247 is coupled with the inlet of the carbonated water container B according to the pivoting of the detachable lever 243 to seal the inlet of the carbonated water container B.

Also, coupling member protrusions 247a coupled with the connecting member 245 which will be described below may be formed on both sides of the coupling member 247.

The connecting member 245 is coupled with the detachable lever 243 and the coupling member 247. In detail, the connecting member 245 converts a pivoting motion force of the detachable lever 243 into a reciprocating motion force and transfers the reciprocating motion force to the coupling member 247.

A first connecting groove 245a coupled with the detachable lever 243 is provided on one side of the connecting member 245, and a second connecting groove 245b coupled with the coupling member 247 is provided on the other side of the connecting member 245.

The connecting member 245 is rotatably coupled with the detachable lever 243 through the first connecting groove 245a. In detail, a detachable lever protrusion 243b of the detachable lever 243 is inserted into the first connecting groove 245a.

Also, the connecting member 245 is rotatably coupled with the coupling member 247 through the second connecting groove 245b. In detail, the coupling member protrusion 247a of the coupling member 247 is inserted into the second connecting groove 245b.

As described above, the detachable lever 243 may pivot on the detachable lever pivot 243a along a first moving path D1.

While the detachable lever 243 is pivoting along the first moving path D1, the detachable lever protrusion 243b pivots along a second moving path D2 and the first connecting groove 245a coupled with the detachable lever protrusion 243b moves together with the detachable lever protrusion 243b along the second moving path D2.

Also, while the first connecting groove 245a is moving along the second moving path D2, the second connecting groove 243b (245b) provided on the other side of the connecting member 245 moves downward along a third path D3 and the coupling member 247 moves downward together with the second connecting groove 243b (245b) along the third path D3.

As a result of the downward movement of the coupling member 247 along the third path D3, the carbonated water container B is coupled with the coupling member 247 and sealed by the coupling member 247.

As described above, the dispenser module 200 may be coupled with the carbonated water container B using various methods.

The dispenser nozzle 250 or 260 may be provided penetrating the coupling member 237 or 247 of the carbonated water container coupling unit 230 or 240 described above, may discharge purified water according to a purified water discharge command of the user, and may discharge the purified water and carbon dioxide according to a carbonated water preparing command of the user.

The dispenser nozzle 250 or 260 may have various shapes.

For example, the dispenser nozzle 250 or 260 may discharge both the purified water and carbon dioxide through one flow channel.

In detail, as shown in FIG. 6a, the dispenser nozzle 250 may include a first discharge pipe 251 which discharges the purified water or carbon dioxide, a second discharge pipe 253 provided inside the first discharge pipe 251, and an elastic body 255 which restores the second discharge pipe 253 to its original state.

The first discharge pipe 251 is provided penetrating the coupling member 237 or 247 of the carbonated water container coupling unit 230 or 240 and may be inserted into the carbonated water container B when the carbonated water container B is coupled with the carbonated water container coupling unit 230 or 240.

Also, the first discharge pipe 251 accommodates the second discharge pipe 253 which will be described below. A stopper 251a which restricts the movement of the second discharge pipe 253 may be provided on a bottom end of the first discharge pipe 251.

The second discharge pipe 253 has an outer diameter smaller than an inner diameter of the first discharge pipe 251 and is provided to be slidably movable inside the first discharge pipe 251.

Also, a sealing protrusion 253a is formed on a top of the second discharge pipe 253 to protrude in a direction of an outer circumference of the second discharge pipe 253 and has an outer diameter identical to the inner diameter of the first discharge pipe 251.

The sealing protrusion 253a described above interrupts the movement of a fluid moving along the first discharge pipe 251 such as the purified water or carbon dioxide.

As a result of the interruption in the movement of the fluid performed by the sealing protrusion 253a, the pressure of the fluid is applied to the sealing protrusion 253a and the second discharge pipe 253 is movable due to the pressure applied to the sealing protrusion 253a.

The elastic body 255 is provided between the stopper 251a of the first discharge pipe 251 and the sealing protrusion 253a of the second discharge pipe 253 and restores the second discharge pipe 253 moved by the pressure of the fluid to its original position using an elastic force.

An operation of the dispenser nozzle 250 will be described.

When the fluid such as the purified water and carbon dioxide is discharged through the first discharge pipe 251, as shown in FIG. 6b, the second discharge pipe 253 moves downward due to the pressure of the fluid. The elastic body 255 is compressed by the movement of the second discharge pipe 253.

Also, when discharging of the fluid is stopped, the elastic body 255 expands due to the elastic force and the second discharge pipe 253 moves to its original position due to a restoring force of the elastic body 255.

As described above, the dispenser nozzle 250 moves the second discharge pipe 253 into the carbonated water container B when the purified water or carbon dioxide is discharged.

As another example, the dispenser nozzle 250 or 260 may discharge the purified water and carbon dioxide through separate flow channels. Particularly, the dispenser nozzle 250 or 260 may have a double pipe structure to discharge the purified water and carbon dioxide through the separate flow channels.

In detail, as shown in FIG. 7a, the dispenser nozzle 260 may include a first discharge pipe 261 which discharges the carbon dioxide, a second discharge pipe 263 provided inside the first discharge pipe 261, an elastic body 265 which restores the second discharge pipe 263 to its original state, and a third discharge pipe 267 which discharges the purified water.

The third discharge pipe 267 is provided penetrating the coupling member 237 or 247 of the carbonated water container coupling unit 230 or 240 and may be inserted into the carbonated water container B when the carbonated water container B is coupled with the carbonated water container coupling unit 230 or 240.

Also, the third discharge pipe 267 may accommodate the first discharge pipe 261 and the second discharge pipe 263 therein.

Between an inner surface of the third discharge pipe 267 and an outer surface of the first discharge pipe 261, a ring-shaped first flow channel path1 is formed and the purified water may be discharged into the carbonated water container B through the first flow channel path1.

The first discharge pipe 261 may be provided inside the third discharge pipe 267.

Also, the first discharge pipe 261 has an outer diameter smaller than an inner diameter of the third discharge pipe 267 and is fixed to the inside of the third discharge pipe 267.

Also, the first discharge pipe 261 may accommodate the second discharge pipe 263. A stopper 261a which restricts the movement of the second discharge pipe 263 may be provided on a bottom end of the first discharge pipe 261.

Inside the first discharge pipe 261, a circular second flow channel path2 is formed and the carbon dioxide may be discharged into the carbonated water container B through the second flow channel path2.

The second discharge pipe 263 has an outer diameter smaller than an inner diameter of the first discharge pipe 261 and is provided to be slidably movable inside the first discharge pipe 261.

Also, a sealing protrusion 263a is formed on a top of the second discharge pipe 263 to protrude in a direction of an outer circumference of the second discharge pipe 263 and has an outer diameter identical to the inner diameter of the first discharge pipe 261.

The sealing protrusion 263a described above interrupts the movement of the carbon dioxide moving along the first discharge pipe 261.

As a result of the interruption in the movement of the carbon dioxide performed by the sealing protrusion 263a, the pressure of the carbon dioxide is applied to the sealing protrusion 263a and the second discharge pipe 263 is movable due to the pressure applied to the sealing protrusion 263a.

The elastic body 265 is provided between the stopper 261a of the first discharge pipe 261 and the sealing protrusion 263a of the second discharge pipe 263.

The elastic body 265 restores the second discharge pipe 263 moved by the pressure of the carbon dioxide to its original position using an elastic force.

Due to the double pipe structure described above, the first flow channel path1 through which the purified water is discharged into the carbonated water container B and the second flow channel path2 through which the carbon dioxide is discharged into the carbonated water container B may be formed in the dispenser nozzle 260.

An operation of the dispenser nozzle 260 will be described.

The purified water, as shown in FIG. 7b, may be discharged through the first flow channel path1 formed between the third discharge pipe 267 and the first discharge pipe 261. Also, while the purified water is being discharged, the second discharge pipe 263 is in position.

The carbon dioxide, as shown in FIG. 7b, may be discharged through the second flow channel path2 formed by the first discharge pipe 261 and the second discharge pipe 263.

When the carbon dioxide is discharged, due to discharging pressure of the carbon dioxide, the second discharge pipe 263 moves downward. The elastic body 265 is compressed by the movement of the second discharge pipe 263.

Also, when discharging of the carbon dioxide is stopped, the elastic body 265 expands due to the elastic force and the second discharge pipe 263 moves to its original position due to a restoring force of the elastic body 265.

As described above, the dispenser nozzle 260 moves the second discharge pipe 263 into the carbonated water container B when the carbon dioxide is discharged.

The dispenser module 200 shown in FIGS. 3 to 7c is merely an example of a discharge means employable by the refrigerator 1 according to one embodiment of the present disclosure but is not limited thereto.

Hereinafter, the purified water supply module 70 and the carbonated water preparing module 100 provided in the refrigerator 1 according to one embodiment of the present disclosure will be described.

FIG. 8 illustrates an example of the carbonated water preparing module and the purified water supply module included in the refrigerator according to one embodiment of the present disclosure. FIG. 9 illustrates an example of a flow sensor included in the refrigerator according to one embodiment of the present disclosure. FIG. 10 illustrates an example of a water level sensor included in the refrigerator according to one embodiment of the present disclosure. FIG. 11 illustrates another example of the water level sensor included in the refrigerator according to one embodiment of the present disclosure.

Referring to FIGS. 8 and 9, the example of the purified water supply module 70 and the carbonated water preparing module 100 will be described.

The purified water supply module 70 supplies purified water discharged through the dispenser module 200 or used for preparing carbonated water.

The purified water supply module 70, as shown in FIG. 8, may include the purified water tank 71, the water purification filter 73 which purifies water supplied from a water source 40, a flow channel switch valve 75 which distributes the purified water to the ice-making device 81 or the purified water tank 71, and the flow sensor 77 which detects an amount of water supplied to the ice-making device 81 or the purified water tank 71.

The purified water tank 71, as described above, may be provided in the plurality of storage boxes 27 (refer to FIG. 2). The water purification filter 73 may be provided near the center of the purified water tank 71.

The flow channel switch valve 75 may be formed of a three way valve which includes an inlet 75a connected to the water purification filter 73, a first outlet 75b connected to the ice-making device 81, and a second outlet 75c connected to the purified water tank 71 as shown in FIG. 5.

The flow channel switch valve 75 may supply the purified water supplied from the water purification filter 73 to any one of the purified water tank 71 and the ice-making device 81.

In detail, when an ice-making operation is not necessary, to supply the purified water to the purified water tank 71, the flow channel switch valve 75 opens a flow channel toward the purified water tank 71 and closes a flow channel toward the ice-making device 81.

Also, when the ice-making operation is necessary, to supply the purified water to the ice-making device 81, the flow channel switch valve 75 closes the flow channel toward the purified water tank 71 and opens the flow channel toward the ice-making device 81.

The flow sensor 77, as shown in FIG. 9, may include a cylindrical flow sensor body 77a and a rotating body 77b inserted into the flow sensor body 77a.

The rotating body 77b may include a holder 77c which rotates due to a flow of the water supplied from the water source 40 and fixes the rotating body 77b to the inside of the flow sensor body 77a, an impeller 77d rotating about a rotation shaft 77e according to the flow of the water, and a permanent magnet 77f rotating together with the impeller 77d.

Also, outside the flow sensor body 77a, a hall sensor 77g which detects a magnetic field generated by the permanent magnet 77f of the rotating body 77b may be provided.

According to the rotation of the permanent magnet 77f, the magnetic field is detected by the hall sensor 77g at the same cycle as a rotation cycle of the rotating body 77b. Whenever the magnetic field is detected, an electric pulse may be output.

The refrigerator 1 may calculate an amount of the water supplied from the external water source 40 to the purified water supply module 70 based on a total number of electric pulses output by the flow sensor 77 and may calculate the velocity of water flow supplied to the purified water supply module 70 based on the number of electric pulses per a unit time, for example, per second.

The flow sensor 77 is between the water purification filter 73 and the flow channel switch valve 75 in FIG. 8 but is not limited thereto and may be provided between the external water source 40 and the water purification filter 73.

The flow sensor 77 shown in FIG. 9 is merely an example of a flow rate sensing means employable by the refrigerator 1 according to one embodiment of the present disclosure but is not limited thereto.

Also, the purified water supply module 70 shown in FIGS. 8 to 9 is merely an example of a purified water supply means employable by the refrigerator 1 according to one embodiment of the present disclosure but is not limited thereto.

The carbonated water preparing module 100 sequentially supplies purified water and carbon dioxide to the carbonated water container B to prepare carbonated water in the carbonated water container B.

The carbonated water preparing module 100 may include an integrated supply flow channel 190 which supplies the purified water or carbon dioxide to the carbonated water container B through the dispenser module 200, a purified water supply flow channel 110 which guides the purified water supplied from the purified water supply module 70 to the integrated supply flow channel 190, a carbon dioxide cylinder 120 which stores the carbon dioxide, a carbon dioxide supply flow channel 150 which guides the carbon dioxide supplied from the carbon dioxide cylinder 120 to the integrated supply flow channel 190, and a water level sensor 130 which detects a water level of the carbonated water container B.

The carbon dioxide cylinder 120 may store carbon dioxide at a high pressure of from about 45 to about 60 bars.

The carbon dioxide stored in the carbon dioxide cylinder 120 may be discharged into the carbonated water container B through the carbon dioxide supply flow channel 150 which connects the carbon dioxide cylinder 120 with the dispenser module 200 and the integrated supply flow channel 190.

The carbon dioxide supply flow channel 150 guides the carbon dioxide stored in the carbon dioxide cylinder 120 to the integrated supply flow channel 190.

Also, on the carbon dioxide supply flow channel 150, there are provided a carbon dioxide supply valve 151 which opens and closes the carbon dioxide supply flow channel 150, a carbon dioxide regulator 153 which controls the pressure of the carbon dioxide, a carbon dioxide pressure sensor 155 which senses carbon dioxide discharge pressure of the carbon dioxide cylinder 120, a carbon dioxide discharge valve 157 which discharges the carbon dioxide inside the carbon dioxide supply flow channel 150 to the outside, and a safety valve 159 which automatically discharges the carbon dioxide inside the carbon dioxide supply flow channel 150 when pressure inside the carbon dioxide supply flow channel 150 exceeds a reference pressure.

The carbon dioxide supply valve 151 opens or closes the carbon dioxide supply flow channel 150. When the carbon dioxide supply valve 151 is open, the carbon dioxide stored in the carbon dioxide cylinder 120 is discharged into the carbonated water container B through the carbon dioxide supply flow channel 150 and the integrated supply flow channel 190.

The carbon dioxide supply valve 151 described above may employ a solenoid valve which opens and closes the carbon dioxide supply flow channel 150 through an electric signal.

The carbon dioxide regulator 153 may be provided at a carbon dioxide outlet of the carbon dioxide cylinder 120 to control the pressure of the carbon dioxide discharged from the carbon dioxide cylinder 120. In detail, the carbon dioxide regulator 153 may lower the pressure of the carbon dioxide discharged into the carbonated water container B to about 8.5 bars.

The carbon dioxide pressure sensor 155 is provided at a carbon dioxide outlet of the carbon dioxide regulator 153 and senses the pressure of the carbon dioxide decompressed by the carbon dioxide regulator 153.

When the pressure of the carbon dioxide decompressed by the carbon dioxide regulator 153 is lower than a predetermined reference supply pressure, the carbon dioxide pressure sensor 155 described above may employ a pressure switch which outputs a low pressure sensing signal corresponding thereto.

The carbon dioxide discharge valve 157 may discharge the carbon dioxide inside the carbon dioxide supply flow channel 150 to the outside.

The carbon dioxide discharge valve 157 may be provided on a first carbon dioxide discharge flow channel 150a diverged from the carbon dioxide supply flow channel 150. The first carbon dioxide discharge flow channel 150a may be provided in the rear of the carbon dioxide supply valve 151 based on a flow of the carbon dioxide. In other words, based on the carbon dioxide supply valve 151, the first carbon dioxide discharge flow channel 150a and the carbon dioxide cylinder 120 are located opposite each other.

As described above, since the first carbon dioxide discharge flow channel 150a is provided in the rear of the carbon dioxide supply valve 151, when the carbon dioxide supply valve 151 is closed while the carbon dioxide is being discharged, the carbon dioxide stored in the carbon dioxide cylinder 120 is not discharged outward even when the carbon dioxide discharge valve 157 is open.

Also, when the carbon dioxide discharge valve 157 is open, the carbon dioxide inside the carbonated water container B is discharged outward.

The carbon dioxide discharge valve 157 described above may employ a solenoid valve which opens and closes the first carbon dioxide discharge flow channel 150a through an electric signal.

The safety valve 159 may also discharge the carbon dioxide inside the carbon dioxide supply flow channel 150 to the outside.

The carbon dioxide discharge valve 157 is open by an electric signal, but the safety valve 159 is automatically open when the pressure inside the carbon dioxide supply flow channel 150 exceeds the reference pressure.

The safety valve 159 may be provided on a second carbon dioxide discharge flow channel 150b diverged from the carbon dioxide supply flow channel 150. The second carbon dioxide discharge flow channel 150b may be provided in front of the carbon dioxide supply valve 151 based on the flow of the carbon dioxide. In other words, based on the carbon dioxide supply valve 151, the second carbon dioxide discharge flow channel 150b and the carbon dioxide cylinder 120 are located on the same side.

The purified water supply flow channel 110 guides the purified water supplied from the purified water supply module 70 to the integrated supply flow channel 190.

Also, a purified water supply valve 111 which opens and closes the purified water supply flow channel 110 is provided on the purified water supply flow channel 110.

The purified water supply valve 111 opens or closes the purified water supply flow channel 110. When the purified water supply valve 111 is open, the purified water supplied from the purified water supply module 70 is discharged into the carbonated water container B through the purified water supply flow channel 110 and the integrated supply flow channel 190.

The purified water supply valve 111 described above may employ a solenoid valve which opens and closes the purified water supply flow channel 110 through an electric signal.

The integrated supply flow channel 190 supplies the purified water or the carbon dioxide to the carbonated water container B through the dispenser module 200.

The integrated supply flow channel 190 may vary in shape with a shape of the dispenser nozzle 250 or 250 described above.

For example, as shown in FIGS. 6a and 6b, when the dispenser nozzle 250 has a single pipe shape, the integrated supply flow channel 190 also has a single pipe shape to be connected to the first discharge pipe 251 of the dispenser nozzle 250.

As another example, as shown in FIGS. 7a to 7c, when the dispenser nozzle 260 has a double pipe shape, the integrated supply flow channel 190 also has a double pipe shape. Also, a flow channel of the integrated supply flow channel 190, through which the purified water is discharged, is connected to the first flow channel path1 of the dispenser nozzle 260 and a flow channel through which the carbon dioxide is discharged is connected to the second flow channel path2 of the dispenser nozzle 260.

The water level sensor 130 may detect an amount of or a level of the purified water supplied from the purified water supply module 70 and stored in the carbonated water container B.

The water level sensor 130 may employ various types of sensors.

For example, when the carbonated water container B is formed of a transparent material, the water level sensor 130 may employ an infrared sensor 131.

The infrared sensor 131, as shown in FIG. 10, may include an infrared sending module 131a which sends infrared rays and an infrared receiving module 131b which receives the infrared rays sent by the infrared sending module 131a.

The infrared sending module 131a and the infrared receiving module 131b, as shown in FIG. 10, may be installed on both walls 211 and 212 of the water dispensing space 210. In detail, the infrared sending module 131a and the infrared receiving module 131b may be installed on both sides based on the carbonated water container B.

For example, when the infrared sending module 131a is installed on a left wall 211 of the water dispensing space 210, the infrared receiving module 131b may be installed on a right wall 212 of the water dispensing space 210. Also, when the infrared sending module 131a is installed on the right wall 212 of the water dispensing space 210, the infrared receiving module 131b may be installed on the left wall 211 of the water dispensing space 210.

Also, the infrared sending module 131a and the infrared receiving module 131b may be installed at positions corresponding to a maximum water level of the carbonated water container B.

When the level of the purified water contained in the carbonated water container B does not reach the maximum water level, the infrared rays sent by the infrared sending module 131a are able to arrive at the infrared receiving module 131b.

On the contrary, when the level of the purified water contained in the carbonated water container B reaches the maximum water level, the infrared rays sent by the infrared sending module 131a scatter due to the purified water contained in the carbonated water container B and the infrared receiving module 131b will receive infrared rays with low intensity.

In other words, when the intensity of the infrared rays sensed by the infrared receiving module 131b is greater than a first reference intensity, the refrigerator 1 may determine that the level of the purified water contained in the carbonated water container B does not reach the maximum water level.

Also, when the intensity of the infrared rays sensed by the infrared receiving module 131b is the first reference intensity or smaller, the refrigerator 1 may determine that the level of the purified water contained in the carbonated water container B reaches the maximum water level.

As another example, when the carbonated water container B is formed of an opaque material, the water level sensor 130, as shown in FIG. 11, may employ a load cell 133.

The load cell 133 may include an elastic body deformed in proportion to an external force and a strain gauge whose electric resistance varies with the deformation of the elastic body. The load cell 133 detects the magnitude of the external force or a weight of an object by measuring the electric resistance of the strain gauge and outputs an electric signal corresponding to the detected external force or weight.

The load cell 133 described above may be installed on the container holding protrusion 231b or 241b included in the mounting member 231 or 241 of the carbonated water container coupling unit 230 or 240.

Since the container holding protrusion 231b or 241b of the mounting member 231 or 241 supports the carbonated water container B to prevent the carbonated water container B from being separated from the mounting member 231 or 241, the same external force as the weight of the carbonated water container B is applied to a top surface of the container holding protrusion 231b or 241b. Accordingly, when the load cell 133 is installed on the top surface of the container holding protrusion 231b or 241b, the load cell 133 may detect the weight of the carbonated water container B.

As a larger amount of water is contained in the carbonated water container B, the weight of the carbonated water container B increases more.

Also, the weight of the carbonated water container B corresponding to the maximum water level of the purified water contained in the carbonated water container B may be set as a reference weight.

Here, when the weight of the carbonated water container B is the reference weight or more, the refrigerator 1 may determine that the level of the purified water contained in the carbonated water container B reaches the maximum water level. When the weight of the carbonated water container B is less than the reference weight, the refrigerator 1 may determine that the level of the purified water contained in the carbonated water container B does not reach the maximum water level.

The refrigerator 1 may estimate the level of the carbonated water container B using the flow sensor 77 described above.

In detail, when a supply amount of the purified water detected using the flow sensor 77 is smaller than the capacity of the carbonated water container B, the refrigerator 1 may determine that the level of the purified water contained in the carbonated water container B does not reach the maximum water level.

Also, when the supply amount of the purified water detected using the flow sensor 77 corresponds to the capacity of the carbonated water container B, the refrigerator 1 may determine that the level of the purified water contained in the carbonated water container B reaches the maximum water level.

As described above, the flow sensor 77 may perform a function of the water level sensor 130 and the refrigerator 1 may not include the water level sensor 130. That is, the water level sensor 130 corresponds to an optional component.

The water level sensor 130 shown in FIGS. 10 and 11 is merely an example of a water level sensing means employable by the refrigerator 1 according to one embodiment of the present disclosure but is not limited thereto.

Also, the carbonated water preparing module 100 shown in FIGS. 8 to 11 is merely an example of a carbonated water preparing means employable by the refrigerator 1 according to one embodiment of the present disclosure but is not limited thereto.

FIG. 12 illustrates another example of the carbonated water preparing module and the purified water supply module included in the refrigerator according to one embodiment of the present disclosure.

Referring to FIG. 12, another example of the purified water supply module 70 and the carbonated water preparing module 100 will be described.

The purified water supply module 70, as shown in FIG. 12, may include the purified water tank 71, the water purification filter 73 which purifies water supplied from the water source 40, the flow channel switch valve 75 which distributes the purified water to the ice-making device 81 or the purified water tank 71, and the flow sensor 77 which detects an amount of water supplied to the ice-making device 81 or the purified water tank 71.

As described above, the purified water supply module 70 has the same configuration as the purified water supply module 70 shown in FIG. 8.

The carbonated water preparing module 100 may include the integrated supply flow channel 190 which supplies the purified water or carbon dioxide to the carbonated water container B through the dispenser module 200, the purified water supply flow channel 110 which guides the purified water supplied from the purified water supply module 70 to the integrated supply flow channel 190, the carbon dioxide cylinder 120 which stores the carbon dioxide, the carbon dioxide supply flow channel 150 which guides the carbon dioxide supplied from the carbon dioxide cylinder 120 to the integrated supply flow channel 190, and the water level sensor 130 which detects a water level of the carbonated water container B.

On the carbon dioxide supply flow channel 150, there are provided the carbon dioxide supply valve 151 which opens and closes the carbon dioxide supply flow channel 150, the carbon dioxide discharge valve 157 which discharges the carbon dioxide inside the carbon dioxide supply flow channel 150 to the outside, and the safety valve 159 which automatically discharges the carbon dioxide inside the carbon dioxide supply flow channel 150 when pressure inside the carbon dioxide supply flow channel 150 exceeds a reference pressure.

Also, the purified water supply valve 111 which opens and closes the purified water supply flow channel 110 is provided on the purified water supply flow channel 110.

As described above, compared with the carbonated water preparing module 100 shown in FIG. 8, the carbonated water preparing module 100 shown in FIG. 12 does not include the carbon dioxide regulator 153 (refer to FIG. 8).

Accordingly, it is necessary for the carbon dioxide supply valve 151 to open and close a flow of the carbon dioxide at a high pressure from about 45 to about 60 bars supplied from the carbon dioxide cylinder 120. As a result thereof, it is difficult for the carbon dioxide supply valve 151 to employ the solenoid valve described above. To control the flow of the carbon dioxide at a high pressure, the refrigerator 1 may employ a particular type valve.

Hereinafter, the carbon dioxide supply valve 151 included in the carbonated water preparing module 100 in a case in which the carbon dioxide regulator 153 controlling the pressure of supplying the carbon dioxide is not included will be described.

FIGS. 13a, 13b, 14a, and 14b illustrate an example of the carbon dioxide supply valve included in the refrigerator according to one embodiment of the present disclosure. FIGS. 15a, 15b, 16a, and 16b illustrate another example of the carbon dioxide supply valve included in the refrigerator according to one embodiment of the present disclosure.

Referring to FIGS. 13a, 13b, 14a, and 14b, a first applicable example of the carbon dioxide supply valve 151 will be described.

The carbon dioxide supply valve 151 may include a carbon dioxide discharge member 179, a carbon dioxide supply motor 171, a worm gear 173, a worm wheel 175, and an eccentric rotation member 177.

The carbon dioxide discharge member 179 may be installed at the carbon dioxide outlet of the carbon dioxide cylinder 120 and may include a carbon dioxide discharge pipe 179b through which the carbon dioxide is discharged and a carbon dioxide discharge button 179a for controlling the carbon dioxide discharge of the carbon dioxide cylinder 120.

When the carbon dioxide discharge button 179a is pressurized, the carbon dioxide stored in the carbon dioxide cylinder 120 is discharged through the carbon dioxide discharge pipe 179b. Also, when the carbon dioxide discharge button 179a is not pressurized, the carbon dioxide stored in the carbon dioxide cylinder 120 is not discharged.

The carbon dioxide supply motor 171 generates torque to pressurize the carbon dioxide discharge button 179a of the carbon dioxide discharge member 179.

The worm gear 173 receives the torque from the carbon dioxide supply motor 171 and rotates about a worm gear rotation shaft 173a. On an outer circumference of the worm gear 173, spiral teeth for providing the torque for the worm wheel 175 are formed.

The worm wheel 175 receives the torque from the worm gear 173 and rotates about a worm wheel rotation shaft 175a. On an outer circumference of the worm wheel 175, teeth for receiving the torque from the worm gear 173 are formed.

The eccentric rotation member 177 rotates together with the worm wheel 175 about the worm wheel rotation shaft 175a.

The eccentric rotation member 177 may have a circular or oval shape with a rotation shaft out of the center. Since the rotation shaft is out of the center as described above, a distance between an outer surface in contact with an outer circumferential surface thereof and the rotation shaft changes while the eccentric rotation member 177 is rotating.

As described above, the eccentric rotation member 177 may pressurize or release the carbon dioxide discharge button 179a of the carbon dioxide discharge member 179 using the change in the distance between the outer surface in contact with the outer circumferential surface and the rotation shaft while the eccentric rotation member 177 is rotating.

In detail, as shown in FIGS. 13a and 13b, when a downward outer circumferential surface of the eccentric rotation member 177 is located at a minimum distance from the worm wheel rotation shaft 175a, the eccentric rotation member 177 does not pressurize the carbon dioxide discharge button 179a and the carbon dioxide is not discharged from the carbon dioxide cylinder 120. In other words, the carbon dioxide supply valve 151 is closed.

As shown in FIGS. 14a and 14b, when the downward outer circumferential surface of the eccentric rotation member 177 is located at a maximum distance from the worm wheel rotation shaft 175a, the eccentric rotation member 177 pressurizes the carbon dioxide discharge button 179a and the carbon dioxide is discharged from the carbon dioxide cylinder 120. In other words, the carbon dioxide supply valve 151 is open.

Referring to FIGS. 15a, 15b, 16a, and 16b, a second applicable example of the carbon dioxide supply valve 151 will be described.

The carbon dioxide supply valve 151 may include a carbon dioxide discharge member 189, a carbon dioxide supply motor 181, a worm gear 183, a worm wheel 185, and an eccentric rotation member 187.

The carbon dioxide discharge member 189 may be installed at the carbon dioxide outlet of the carbon dioxide cylinder 120 and may include a carbon dioxide discharge pipe 189b through which the carbon dioxide is discharged, a carbon dioxide discharge button 189a for controlling the carbon dioxide discharging of the carbon dioxide cylinder 120, and a carbon dioxide discharge bar 189c which pressurizes the carbon dioxide discharge button 189a.

The carbon dioxide discharge bar 189c may pressurize the carbon dioxide discharge button 189a due to an external force. When the carbon dioxide discharge button 189a is pressurized, the carbon dioxide stored in the carbon dioxide cylinder 120 is discharged through the carbon dioxide discharge pipe 189b. Also, when the carbon dioxide discharge button 189a is not pressurized, the carbon dioxide stored in the carbon dioxide cylinder 120 is not discharged.

The carbon dioxide supply motor 181, the worm gear 183, the worm wheel 185, and the eccentric rotation member 187 are identical to the carbon dioxide supply motor 171, the worm gear 173, the worm wheel 175, and the eccentric rotation member 177 described with reference to FIGS. 13a, 13b, 14a, and 14b.

Also, the eccentric rotation member 187 may pressurize or release the carbon dioxide discharge button 189a through the carbon dioxide discharge bar 189c using the change in the distance between the outer surface in contact with the outer circumferential surface and the rotation shaft while the eccentric rotation member 187 is rotating.

In detail, as shown in FIGS. 15a and 15b, when a downward outer circumferential surface of the eccentric rotation member 187 is located at a minimum distance from a worm wheel rotation shaft 185a, the eccentric rotation member 187 does not pressurize the carbon dioxide discharge button 189a through the carbon dioxide discharge bar 189c and the carbon dioxide is not discharged from the carbon dioxide cylinder 120. In other words, the carbon dioxide supply valve 151 is closed.

As shown in FIGS. 16a and 16b, when the downward outer circumferential surface of the eccentric rotation member 187 is located at a maximum distance from the worm wheel rotation shaft 185a, the eccentric rotation member 187 pressurizes the carbon dioxide discharge button 189a through the carbon dioxide discharge bar 189c and the carbon dioxide is discharged from the carbon dioxide cylinder 120. In other words, the carbon dioxide supply valve 151 is open.

As described above, when the carbon dioxide discharge button 189a is pressurized using the carbon dioxide discharge bar 189c, as shown in FIGS. 15a, 15b, 16a, and 16b, compared with the case of directly pressurizing the carbon dioxide discharge button 179a, the displacement of the carbon dioxide discharge button 189a increases.

Since the displacement of the carbon dioxide discharge button 189a increases, it is possible to more increase a distance between the center of the eccentric rotation member 187 and the rotation shaft and to increase the pressure caused by the eccentric rotation member 187.

In other words, using a small torque of the carbon dioxide supply motor 181, the eccentric rotation member 187 may pressurize the carbon dioxide discharge button 189a.

The carbon dioxide supply valve 151 shown in FIGS. 13a to 16b is merely an example of a discharge means employable by the refrigerator 1 according to one embodiment of the present disclosure but is not limited thereto.

For example, the carbon dioxide supply valve 151 may not include the worm gear 173 or 183 and the worm wheel 175 or 185 and the carbon dioxide supply motor 171 or 181 and the eccentric rotation member 177 or 187 may rotate about the same rotation shaft. That is, the torque generated by the carbon dioxide supply motor 171 or 181 may be directly transferred to the eccentric rotation member 177 or 187.

FIG. 17 illustrates an example of a flow of a control signal between components included in the refrigerator according to one embodiment of the present disclosure. FIG. 18 illustrates an example of a user interface included in the refrigerator according to one embodiment of the present disclosure.

As shown in FIG. 17, the refrigerator 1 may include the dispenser module 200, the flow sensor 77 and the flow channel switch valve 75 included in the purified water supply module 70, and the water level sensor 130 and the various valves 111, 151, and 157 included in the carbonated water preparing module 100. Also, the refrigerator 1 may further include the user interface 300 which interacts with the user, a storage unit 400 which stores programs and data related to the operation of the refrigerator 1, and a control unit 500 which totally controls the operation of the refrigerator 1.

Since the dispenser module 200, the flow sensor 77 and the flow channel switch valve 75 included in the purified water supply module 70, and the water level sensor 130 and the various valves 111, 151, and 157 included in the carbonated water preparing module 100 have already been described, a repetitive description thereof will be omitted.

The user interface 300, as shown in FIG. 18, may include a carbonated water preparing display area 310 which receives a carbonated water preparing command from the user and displays carbonated water preparing information, a carbonated water concentration setting area 320 which receives a carbonated water concentration setting command from the user and displays carbonated water concentration setting information, a water level display area 340 which displays an amount of purified water supplied to the carbonated water container B or a water level of the purified water, and a message display area 350 which displays various messages.

Each of the areas 310, 320, 340, and 350 included in the user interface 300 may include a touch switch which senses a touch or pressure of the user and a display which displays images to the user.

As the touch switch, a push switch or a membrane switch which senses the pressure of the user or a touch pad which senses the touch of the user may be employed. Also, the display may employ one of a liquid crystal display (LCD) panel, a light emitting diode (LED) panel, and an organic LED (OLED) panel.

Each of the areas 310, 320, 340, and 350 included in the user interface 300 may employ a touch screen which is formed of a touch switch and a display integrated with each other to receive a control command according to the touch of the user and to display operation information corresponding to the control command.

The carbonated water preparing display area 310 may receive the carbonated water preparing command from the user.

In detail, the carbonated water preparing display area 310 may include a low pressure display area 311 which warns that the pressure of carbon dioxide discharged from the carbon dioxide cylinder 120 is less than a reference pressure and a carbonated water preparing display area 313 which receives the carbonated water preparing command and displays that the carbonated water is being prepared.

For example, when the pressure of the carbon dioxide discharged by the carbon dioxide cylinder 120 is less than the reference pressure, the refrigerator 1 displays a low pressure display image on the low pressure display area 311, thereby warning of the low pressure of the carbon dioxide. Also, when the refrigerator 1 is preparing the carbonated water, the refrigerator 1 may display the preparing of the carbonated water to the user by displaying a carbonated water preparing image on the carbonated water preparing display area 313.

Also, when the user touches or pressurizes the carbonated water preparing display area 310, the refrigerator 1 may start preparing the carbonated water and may display the carbonated water preparing display image on the carbonated water preparing display area 313.

The carbonated water concentration setting area 320 may receive the carbonated water concentration setting command from the user.

The carbonated water concentration setting area 320 may include a present concentration display area 321 which displays the concentration of carbonated water contained in the carbonated water container B while preparing the carbonated water and a target concentration display area 323 which displays a target carbonated water concentration set by the user.

For example, as shown in FIG. 18, the present concentration display area 321 may display the concentration of the carbonated water contained in the carbonated water container B as a 7-segment form while preparing the carbonated water and the target concentration display area 323 may display an image corresponding to the target concentration input by the user.

Also, when the user touches or pressurizes the carbonated water concentration setting area 320, the refrigerator 1 changes the target carbonated water concentration and changes the target concentration displayed on the target concentration display area 323.

The water level display area 340 may display the amount or level of the purified water supplied to the carbonated water container B.

For example, the refrigerator 1 may divide a range between a minimum water level and a maximum water level of the purified water supplied to the carbonated water container B into three levels and the water level display area 340 may display indicators whose number varies with the level of the carbonated water.

In detail, one indicator may be shown when the level of the purified water supplied to the carbonated water container B corresponds to ⅓ of the maximum level, two indicators may be shown when the level of the purified water supplied to the carbonated water container B corresponds to ⅔ of the maximum level, and three indicators may be shown when the level of the purified water supplied to the carbonated water container B corresponds to the maximum level.

The message display area 350 may display various types of messages to allow the refrigerator 1 to interact with the user.

For example, it is possible to display a container insertion checking message to check the insertion of the carbonated water container B while preparing the carbonated water, a container non-insertion warning message in a case that the carbonated water container B is not inserted, a carbonated water preparing start message when preparing the carbonated water begins, and a carbonated water preparing completion message when preparing the carbonated water is completed.

The storage unit 400 stores a program and data related to a cooling operation of the refrigerator 1 and a program and data related to preparing carbonated water.

For example, the storage unit 400 may store a target temperature of the refrigeration compartment 20 and a target temperature of the freezing compartment 30 related to the cooling operation and may store a water level, a present concentration, and target concentration of carbonated water related to the preparing of the carbonated water.

The storage unit 400 described above may include a nonvolatile memory which permanently stores programs and data for controlling the operation of the refrigerator 1 such as a magnetic disc drive and a solid state drive.

The control unit 500 generally controls the operation of the refrigerator 1.

In detail, the control unit 500 may control the carbonated water preparing module 100 to prepare carbonated water according to the carbonated water preparing command of the user and the target concentration.

The control unit 500 described above may include a memory 520 which stores a control program and control data from the storage unit 400 and a microprocessor 510 which performs an operation according to the control program and control data stored in the memory 520.

The memory 520 may include a volatile memory such as a static random access memory (SRAM) and a dynamic random access memory (DRAM). However, the memory 520 is not limited thereto and may include a non-volatile memory such as a flash memory and erasable programmable read only memory (EPROM) as necessary.

The microprocessor 510 performs the operation to control various components included in the refrigerator 1 according to the control program and control data stored in the memory 520.

In detail, the microprocessor 510 processes the control command input through the user interface 300, processes sensing results of the flow sensor 77 and the water level sensor 130, and performs an operation for controlling the purified water supply valve 111, the carbon dioxide supply valve 151, the carbon dioxide discharge valve 157, and the flow channel switch valve 75.

An operation of the refrigerator 1 which will be described below may be considered as an operation caused by a control operation of the control unit 500.

As described above, the configuration of the refrigerator 1 according to one embodiment of the present disclosure has been described.

Hereinafter, an operation of the refrigerator 1 according to one embodiment of the present disclosure, and more particularly, a carbonated water preparing operation of the carbonated water preparing module 100 will be described.

The operation of the refrigerator 1 will be briefly described.

The refrigerator 1 maintains temperatures of the storage compartments 20 and 30 within certain ranges using a chilly air supply device.

In detail, the refrigerator 1 controls the temperatures of the refrigeration compartment 20 and the freezing compartment 30 according to a refrigeration compartment target temperature and a freezing compartment target temperature input by the user through the user interface 300.

For example, the refrigerator 1 may control the temperature of the refrigeration compartment 20 to be from about 3 to about 4° C. and control the temperature of the freezing compartment 30 to be from about −18 to about −20° C.

The chilly air supply device described above may maintain the temperatures of the storage compartments 20 and 30 within the certain ranges using the evaporation of refrigerants. In detail, the chilly air supply device may include a compressor which compresses gaseous refrigerants, a condenser which converts the compressed gaseous refrigerants to liquid refrigerants, an expander which decompresses the liquid refrigerants, and an evaporator which converts the decompressed liquid refrigerants to a gaseous state.

Particularly, the chilly air supply device may supply the chilly air to the storage compartments 20 and 30 using a phenomenon in which the decompressed liquid refrigerants absorb heat energy of the air therearound while being converted to the gaseous state.

As described above, the purified water tank 71 which stores purified water may be provided inside the refrigeration compartment 20, thereby maintaining water stored in the purified water tank 71 within a range from about 3 to about 4° C.

Next, a method of preparing carbonated water through the refrigerator 1 will be described.

FIG. 19 illustrates an example of a method 1000 of preparing carbonated water in which the refrigerator prepares the carbonated water according to one embodiment of the present disclosure.

Referring to FIG. 19, the refrigerator 1 determines whether to prepare carbonated water (S1100). The refrigerator 1 may determine to prepare the carbonated water when a carbonated water preparing condition is satisfied.

In detail, when a carbonated water preparing command of the user is input and the carbonated water container B is inserted into the dispenser module 200, the refrigerator 1 may start preparing the carbonated water.

When it is not determined to prepare the carbonated water (NO for S1100), the refrigerator 1 continues an operation which has been previously performed.

When it is determined to prepare the carbonated water (YES for S1100), the refrigerator 1 supplies purified water to the carbonated water container B (S1200).

The refrigerator 1 may open the carbon dioxide discharge valve 157 and the purified water supply valve 111 to supply the purified water to the carbonated water container B.

Also, the refrigerator 1 may close the carbon dioxide discharge valve 157 and the purified water supply valve 111 when a water level of the purified water contained in the carbonated water container B reaches a maximum water level.

When it is completed to supply the purified water to the carbonated water container B, the refrigerator 1 supplies carbon dioxide to the carbonated water container B (S1300).

The refrigerator 1 may open the carbon dioxide supply valve 151 for a predetermined carbon dioxide supply time to supply the carbon dioxide to the carbonated water container B.

Also, when the carbon dioxide supply time passes, the refrigerator 1 may close the carbon dioxide supply valve 151 and may open the carbon dioxide discharge valve 157 for a carbon dioxide discharge time.

When the carbon dioxide discharge time passes, the refrigerator 1 may close the carbon dioxide discharge valve 157.

As described above, the supply and discharge of the carbon dioxide are alternately repeated, thereby dissolving the carbon dioxide in the purified water contained in the carbonated water container B.

Also, the concentration of the prepared carbonated water may be controlled by controlling the number of supplying and discharging the carbon dioxide. That is, it is possible to control the concentration of the carbonated water by controlling the number of supplying the carbon dioxide.

Hereinafter, the start of preparing the carbonated water (S1100), the supply of the purified water (S1200), and the supply of the carbon dioxide (S1300) will be described in detail.

The start of preparing the carbonated water (S1100) will be described.

FIG. 20 illustrates an example of the method of preparing carbonated water in which the refrigerator determines whether to prepare the carbonated water according to one embodiment of the present disclosure. FIG. 21 illustrates an example in which the refrigerator determines whether the carbonated water container is inserted according to one embodiment of the present disclosure.

Referring to FIGS. 20 and 21, the start of preparing the carbonated water (S1100) will be described.

The refrigerator 1 determines whether a carbonated water preparing command is input from the user (S1110).

The user may set the concentration of the carbonated water using the user interface 300 before inputting the carbonated water preparing command.

In detail, the user may set a preferable concentration of the carbonated water through the carbonated water concentration setting area 320 included in the user interface 300.

For example, when the refrigerator 1 provides carbonated water having a plurality of predetermined concentrations, the user may select the preferable concentration of the carbonated water by touching or pressurizing the carbonated water concentration setting area 320.

As another example, when the refrigerator 1 receives the number of injecting carbon dioxide from the user, the user may select the number of injecting the carbon dioxide corresponding to the concentration of the carbonated water.

When the setting of the concentration of the carbonated water is finished, the user may input the carbonated water preparing command through the carbonated water preparing display area 310 included in the user interface 300.

In detail, the user may input the carbonated water preparing command to the refrigerator 1 by touching or pressurizing the carbonated water preparing display area 310 included in the user interface 300.

When the carbonated water preparing command is not input (NO for S1110), the refrigerator 1 continues an operation which has been previously performed.

When the carbonated water preparing command is input (YES for S1110), the refrigerator 1 determines whether the carbonated water container B is inserted in the dispenser module 200 (S1120).

The refrigerator 1 may determine whether the carbonated water container B is inserted in the dispenser module 200 in various ways.

For example, the refrigerator 1 may display a message for checking whether the carbonated water container B is inserted through the user interface 300 and may allow the user to confirm the insertion of the carbonated water container B.

In detail, the refrigerator 1 may display a message for checking the insertion of the carbonated water container B on the message display area 350 of the user interface 300 as shown in FIG. 21.

In the message display area 350, it is possible to display a container insertion check message 351 for checking whether the carbonated water container B is inserted in the dispenser module 200, a confirmation button 353 which confirms the insertion of the carbonated water container B, and a cancellation button 355 to cancel preparing the carbonated water.

When the user touches or pressurizes the confirmation button 353, the refrigerator 1 may determine that the carbonated water container B is inserted in the dispenser module 200.

When the user touches the cancellation button 355 or does not touch the confirmation button 353 for a predetermined confirmation standby time, the refrigerator 1 may determine that the carbonated water container B is not inserted in the dispenser module 200.

As described above, the refrigerator 1 allows the user to input whether the carbonated water container B is inserted in the dispenser module 200.

As another example, the refrigerator 1 may detect the carbonated water container B inserted in the dispenser module 200 using a sensor.

In detail, when the infrared sensor 131 is employed as the water level sensor 130, the refrigerator 1 may determine whether the carbonated water container B is inserted in the dispenser module 200 based on the intensity of infrared rays sensed by the infrared receiving module 131b of the infrared sensor 131.

When the carbonated water container B is inserted in the dispenser module 200, since infrared rays sent by the infrared sending module 131a scatter due to the carbonated water container B, the intensity of the infrared rays sensed by the infrared receiving module 131b decreases.

In other words, when the intensity of the infrared rays sensed by the infrared receiving module 131b is greater than a second reference intensity, the refrigerator 1 may determine that the carbonated water container B is not inserted in the dispenser module 200. Also, when the intensity of the infrared rays sensed by the infrared receiving module 131b is the second reference intensity or less, the refrigerator 1 may determine that the carbonated water container B is inserted in the dispenser module 200.

Here, the second reference intensity may be greater than the first reference intensity for determining the level of the purified water contained in the carbonated water container B.

Also, when the load cell 133 is employed as the water level sensor 130, the refrigerator 1 may determine whether the carbonated water container B is inserted in the dispenser module 200 based on a weight sensed by the load cell 133.

In other words, when the weight sensed by the load cell 133 is greater than "0", the refrigerator 1 may determine that the carbonated water container B is inserted in the dispenser module 200. Also, when the weight sensed by the load cell 133 is "0", the refrigerator 1 may determine that the carbonated water container B is not inserted in the dispenser module 200.

As described above, the refrigerator 1 may directly check whether the carbonated water container B is inserted in the dispenser module 200 using the water level sensor 130 described above.

When the carbonated water container B is not inserted (NO for S1120), the refrigerator 1 warns the user of non-insertion of the carbonated water container B (S1130).

For example, the refrigerator 1 may display a container non-insertion message which indicates that the carbonated water container B is not inserted in the dispenser module 200 on the message display area 350 of the user interface 300.

Also, the refrigerator 1 may stop preparing the carbonated water.

When the carbonated water container B is inserted (YES for S1120), the refrigerator 1 may display preparing of the carbonated water (S1140).

For example, the refrigerator 1 may display a carbonated water preparing start message which indicates the start of preparing the carbonated water on the message display area 350 of the user interface 300.

Also, the refrigerator 1 may display a carbonated water preparing image on the carbonated water preparing display area 313 of the user interface 300.

Hereinafter, the refrigerator 1 may start the preparing of the carbonated water.

As described above, the refrigerator 1 determines whether the carbonated water preparing command is input and whether the carbonated water container B is inserted to determine whether to prepare the carbonated water.

Next, a method 1200 of supplying purified water will be described.

FIG. 22 illustrates an example of the method 1200 of supplying purified water in which the refrigerator supplies purified water to the carbonated water container according to one embodiment of the present disclosure. FIGS. 23 and 24 illustrate an example in which the refrigerator supplies the purified water to the carbonated water container according to one embodiment of the present disclosure.

Referring to FIGS. 22 to 24, the method 1200 of supplying the purified water will be described.

The refrigerator 1 opens the carbon dioxide discharge valve 157 (S1210).

In detail, the control unit 500 of the refrigerator 1 may transmit a valve opening signal to the carbon dioxide discharge valve 157.

As described above, the refrigerator 1 opens the carbon dioxide discharge valve 157 to prevent the purified water from being hindered by pressure inside the carbonated water container B while the purified water is being supplied.

The refrigerator 1 opens the purified water supply valve 111 (S1220).

In detail, the control unit 500 of the refrigerator 1 may transmit a valve opening signal to the purified water supply valve 111.

When the purified water supply valve 111 is open, as shown in FIG. 23, the purified water moves to the dispenser module 200 along the purified water supply flow channel 110 and the integrated supply flow channel 190. Also, the purified water, as shown in FIG. 24, may be supplied to the carbonated water container B through the dispenser module 200.

Here, a force necessary for compressing the elastic body 255 of the dispenser nozzle 250 may be set greater than the pressure of supplying the purified water and the second discharge pipe 253 of the dispenser nozzle 250 does not protrude downward.

After that, the refrigerator 1 determines whether a level of the purified water contained in the carbonated water container B reaches a maximum water level (S1230).

The refrigerator 1 may determine whether the level of the purified water contained in the carbonated water container B reaches the maximum water level in various ways.

For example, the refrigerator 1 may determine whether the level of the purified water contained in the carbonated water container B reaches the maximum water level using the water level sensor 130.

When the infrared sensor 131 is employed as the water level sensor 130, the refrigerator 1 may determine whether the level of the purified water contained in the carbonated water container B reaches the maximum water level based on the intensity of infrared rays received by the infrared receiving module 131b.

In detail, when the intensity of the infrared rays sensed by the infrared receiving module 131b is greater than the first reference intensity, the refrigerator 1 may determine that the level of the purified water contained in the carbonated water container B does not reach the maximum water level. Also, when the intensity of the infrared rays sensed by the infrared receiving module 131b is the first reference intensity or smaller, the refrigerator 1 may determine that the level of the purified water contained in the carbonated water container B reaches the maximum water level.

Also, when the load cell 133 is employed as the water level sensor 130, the refrigerator 1 may determine whether the level of the purified water contained in the carbonated water container B reaches the maximum water level based on a weight sensed by the load cell 133.

In detail, when the weight of the carbonated water container B is the reference weight or more, the refrigerator 1 may determine that the level of the purified water contained in the carbonated water container B reaches the maximum water level. When the weight of the carbonated water container B is less than the reference weight, the refrigerator 1 may determine that the level of the purified water contained in the carbonated water container B does not reach the maximum water level.

As still another example, when the refrigerator 1 does not include the water level sensor 130, the refrigerator 1 may determine whether the level of the purified water reaches the maximum water level using the flow sensor 77.

Since the purified water is supplied to the carbonated water container B through the purified water tank 71 by the water pressure of the external water source 40, an amount of purified water supplied to the carbonated water container B is identical to an amount of water supplied from the external water source 40 to the purified water supply module 70. Also, the refrigerator 1 may measure a supply amount of the water supplied from the external water source 40 to the purified water supply module 70 using the flow sensor 77.

Accordingly, the refrigerator 1 may detect the amount of the purified water supplied to the carbonated water container B using the flow sensor 77.

Also, the refrigerator 1 may compare the supply amount of the purified water detected by the flow sensor 77 with a target supply amount. Here, the target supply amount may be directly input by the user. Also, when the user inputs a type of the carbonated water container B, the refrigerator 1 may select a target supply amount corresponding to the capacity of the input carbonated water container B.

Accordingly, when the supply amount of the purified water detected by the flow sensor 77 is the target supply amount or more, the refrigerator 1 may determine that the level of the purified water contained in the carbonated water container B reaches the maximum water level. Also, when the supply amount of the purified water detected by the flow sensor 77 is less than the target supply amount, the refrigerator 1 may determine that the level of the purified water contained in the carbonated water container B does not reach the maximum water level.

When the level of the purified water contained in the carbonated water container B is smaller than the maximum water level (NO for S1230), the refrigerator 1 maintains opening of the purified water supply valve 111.

When the level of the purified water contained in the carbonated water container B is the maximum water level or more (YES for S1230), the refrigerator 1 closes the purified water supply valve 111 (S1240).

In detail, the control unit 500 of the refrigerator 1 may transmit a valve closing signal to the purified water supply valve 111.

After that, the refrigerator 1 closes the carbon dioxide discharge valve 157 (S1250).

In detail, the control unit 500 of the refrigerator 1 may transmit a valve closing signal to the carbon dioxide discharge valve 157.

As described above, the refrigerator 1 may supply the purified water to the maximum water level of the carbonated water container B.

Next, a method 1300 of supplying carbon dioxide will be described.

FIG. 25 illustrates an example of the method of supplying carbon dioxide in which the refrigerator supplies the carbon dioxide to the carbonated water container according to one embodiment of the present disclosure. FIGS. 26 and 27 illustrate an example in which the refrigerator supplies the carbon dioxide to the carbonated water container according to one embodiment of the present disclosure. FIG. 28 illustrates an example in which the refrigerator controls the concentration of carbonated water according to one embodiment of the present disclosure.

Referring to FIGS. 25 to 28, the method 1300 of supplying the carbon dioxide will be described.

The refrigerator 1 opens the carbon dioxide supply valve 151 (S1310).

In detail, the control unit 500 of the refrigerator 1 may transmit a valve opening signal to the carbon dioxide supply valve 151.

When the carbon dioxide supply valve 151 is open, as shown in FIG. 26, the carbon dioxide moves to the dispenser module 200 along the carbon dioxide supply flow channel 150 and the integrated supply flow channel 190.

Also, the carbon dioxide, as shown in FIG. 27, may be supplied to the carbonated water container B through the dispenser module 200.

Here, a force necessary for compressing the elastic body 255 of the dispenser nozzle 250 may be set smaller than the pressure of supplying the carbon dioxide and the second discharge pipe 253 of the dispenser nozzle 250 protrudes downward.

The second discharge pipe 253 is inserted below a surface of purified water contained in the carbonated water container B. The carbon dioxide is in direct contact with the purified water while being supplied to the carbonated water container B. That is, the carbon dioxide supplied to the carbonated water container B generates air bubbles in the purified water as shown in FIG. 27.

A dissolving speed of the carbon dioxide is determined by various factors. For example, the dissolving speed of the carbon dioxide becomes higher as a temperature of the purified water is lower and the pressure of the carbon dioxide is higher.

Also, the dissolving speed of the carbon dioxide may become higher due to the agitation of the purified water and the carbon dioxide. In other words, when the purified water and the carbon dioxide are agitated, the carbon dioxide may more quickly dissolve in the purified water than not being agitated.

When the carbon dioxide generates air bubbles while the carbon dioxide is being supplied, the agitation of the carbon dioxide and the purified water is performed by the air bubbles and a contact area between the carbon dioxide and the purified water increases.

As a result thereof, the carbon dioxide quickly dissolves in the purified water. That is, the carbon dioxide is supplied below the surface of the purified water, thereby more quickly dissolving the carbon dioxide in the purified water than supplying the carbon dioxide above the surface of the purified water.

After that, the refrigerator 1 determines whether a reference supply time T1 passes after opening the carbon dioxide supply valve 151 (S1320).

The refrigerator 1 determines whether a time for supplying the carbon dioxide is the reference supply time T1 or more. The reference supply time T1 may be set based on a pressure limit of the carbonated water container B.

As the time for supplying the carbon dioxide increases, pressure inside the carbonated water container B increases. When the pressure inside the carbonated water container B reaches a limit, the carbonated water container B may be deformed or may be separated from the dispenser module 200.

As described above, to prevent the pressure inside the carbonated water container B from reaching the limit, the reference supply time T1 is set smaller than a predetermined pressure limit.

When the reference supply time T1 passes after opening the carbon dioxide supply valve 151 (YES for S1320), the refrigerator 1 closes the carbon dioxide supply valve 151 (S1340).

In detail, when the time for supplying the carbon dioxide is the reference supply time T1 or more, the control unit 500 of the refrigerator 1 may transmit a valve closing signal to the carbon dioxide supply valve 151.

After that, the refrigerator 1 opens the carbon dioxide discharge valve 157 (S1340).

In detail, to discharge the carbon dioxide contained in the carbonated water container B, the control unit 500 of the refrigerator 1 may transmit a valve opening signal to the carbon dioxide discharge valve 157.

As described above, when the carbon dioxide generates the air bubbles while the carbon dioxide is being supplied, the agitation of the carbon dioxide and the purified water is performed and the carbon dioxide may quickly dissolve in the purified water.

That is, a dissolving speed of the carbon dioxide is higher when the carbon dioxide is continuously supplied in the purified water to be agitated together than when the carbon dioxide dissolves in the purified water on an interface between the carbon dioxide and the purified water, that is, the surface of the purified water.

However, when the carbon dioxide is continuously supplied to the carbonated water container B, pressure inside the carbonated water container B exceeds a pressure limit in such a way that the carbonated water container B may be deformed or may be separated from the dispenser module 200.

As described above, to prevent the pressure inside the carbonated water container B from exceeding the pressure limit and to supply the carbon dioxide again, the refrigerator 1 discharges the carbon dioxide from the carbonated water container B after supplying the carbon dioxide.

After that, it is determined whether a reference discharge time T2 passes after the carbon dioxide discharge valve 157 is open (S1350).

The refrigerator 1 determines whether a time for discharging the carbon dioxide is the reference discharge time T2 or more. The reference discharge time T2 may be determined to be a time appropriate for discharging the carbon dioxide inside the carbonated water container B to the outside. Since the carbon dioxide is relatively quickly discharged due to the pressure inside the carbonated water container B, the reference discharge time T2 may be determined to be shorter than the reference supply time T1.

When the reference discharge time T2 passes after opening the carbon dioxide discharge valve 157 (YES for S1350), the refrigerator 1 closes the carbon dioxide discharge valve 157 (S1360).

In detail, when the time for discharging the carbon dioxide is the reference discharge time T2 or more, the control unit 500 of the refrigerator 1 may transmit a valve closing signal to the carbon dioxide discharge valve 157.

To sum up, the refrigerator 1 may open the carbon dioxide supply valve 151 for the reference supply time T1 and then close it and may open the carbon dioxide discharge valve 157 for the reference discharge time T2 and then close it.

After that, the refrigerator 1 determines whether the concentration of the carbonated water in the carbonated water container B reaches target concentration (S1370).

The refrigerator 1 may estimate the concentration of the carbonated water based on the number of supplying the carbon dioxide.

For example, the refrigerator 1 determines whether the number of supplying the carbon dioxide reaches a target supply number corresponding to the target concentration input by the user.

As shown in FIG. 28, the refrigerator 1 may repetitively open and close the carbon dioxide supply valve 151 and the carbon dioxide discharge valve 157 until the number of supplying the carbon dioxide reaches the target supply number.

In detail, to prepare carbonated water in the target concentration, the refrigerator 1 may open and close the carbon dioxide supply valve 151, may open and close the carbon dioxide discharge valve 157, may open and close the carbon dioxide supply valve 151, and then may open and close the carbon dioxide discharge valve 157.

To prepare carbonated water in low concentration, the refrigerator 1, as shown in FIG. 28(*a*), may perform twice supplying and discharging of the carbon dioxide.

Also, to prepare carbonated water in intermediate concentration, the refrigerator 1, as shown in FIG. 28(*b*), may perform three times supplying and discharging of the carbon dioxide. To prepare carbonated water in high concentration, the refrigerator 1, as shown in FIG. 28(*c*), may perform four times supplying and discharging of the carbon dioxide.

As described above, the refrigerator 1 may set a target supply number of carbon dioxide corresponding to the concentration of carbonated water input by the user through the user interface 300 and may determine whether the number of supplying the carbon dioxide to the carbonated water container B reaches the target supply number.

Also, when the number of supplying the carbon dioxide to the carbonated water container B is identical to the target supply number, the refrigerator 1 may determine that the concentration of the carbonated water reaches the target concentration. When the number of supplying the carbon dioxide to the carbonated water container B is smaller than the target supply number, the refrigerator 1 may determine that the concentration of the carbonated water does not reach the target concentration.

As another example, the refrigerator 1 may determine whether the number of supplying the carbon dioxide reaches a target injection number directly input by the user.

As described above, the user may not only input the target concentration through the user interface 300 but also input the number of injecting the carbon dioxide.

When the user inputs the target injection number of the carbon dioxide through the user interface 300, the refrigerator 1 may compare the target injection number input by the user with the number of supplying the carbon dioxide.

In detail, when the number of supplying the carbon dioxide to the carbonated water container B is identical to the target injection number, the refrigerator 1 may determine that the concentration of the carbonated water reaches the target concentration. When the number of supplying the carbon dioxide to the carbonated water container B is smaller than the target injection number, the refrigerator 1 may determine that the concentration of the carbonated water does not reach the target concentration.

When the concentration of the carbonated water contained in the carbonated water container B does not reach the target concentration (NO for S1370), the refrigerator repeats supplying the carbon dioxide to the carbonated water container B and discharging the carbon dioxide from the carbonated water container B.

When the concentration of the carbonated water contained in the carbonated water container B reaches the target concentration (YES for S1370), the refrigerator 1 displays completion of preparing the carbonated water.

For example, the refrigerator 1 may display a carbonated water preparing completion message which indicates the completion of preparing the carbonated water on the message display area 350 of the user interface 300.

Also, the refrigerator 1 may remove the carbonated water preparing image displayed on the carbonated water preparing display area 313 of the user interface 300.

As described above, the refrigerator 1 may repeat supplying and discharging carbon dioxide to prepare carbonated water, thereby quickly preparing the carbonated water.

In the above, the carbonated water preparing module 100 for preparing carbonated water in the carbonated water container B and the method 1000 of preparing carbonated water using the carbonated water preparing module 100 have been described. However, it is merely an example of a carbonated water preparing means and it is possible to prepare carbonated water using various components in various ways.

FIG. 29 illustrates yet another example of the carbonated water preparing module and the purified water supply module included in the refrigerator according to one embodiment of the present disclosure.

Referring to FIG. 29, the purified water supply module 70 may include the purified water tank 71 which stores purified water, the water purification filter 73 which purifies water supplied from the water source 40, and the flow channel switch valve 75 which distributes the purified water to the ice-making device 81 or the purified water tank 71.

Also, a carbonated water preparing module 600 may include an integrated discharge flow channel 690 which discharges carbonated water or purified water, a purified water pump 610 which pumps the purified water to prepare carbonated water, a carbon dioxide cylinder 620 which stores carbon dioxide, a mixing pipe 630 which mixes the purified water output from the purified water pump 610 with the carbon dioxide output from the carbon dioxide cylinder 620, a purified water supply flow channel 670 which guides the purified water from the purified water supply module 70 to the purified water pump 610, a carbon dioxide supply flow channel 650 which guides the carbon dioxide from the carbon dioxide cylinder 620 to the mixing pipe 630, and a purified water discharge flow channel 660 which guides the purified water from the purified water supply module 70 to the integrated discharge flow channel 690.

The purified water supply flow channel 670 guides the purified water supplied from the purified water supply module 70 to the purified water pump 610 and includes a check valve 671 which prevents backflow of the purified water.

The purified water pump 610 pumps the purified water supplied from the purified water supply module 70 to the mixing pipe 630. The high pressure purified water pumped by the purified water pump 610 is mixed with the carbon dioxide in the mixing pipe 630.

The carbon dioxide cylinder 620 may store carbon dioxide at a high pressure of from about 45 to about 60 bars. The carbon dioxide stored in the carbon dioxide cylinder 620 may be supplied to the mixing pipe 630 through the carbon dioxide supply flow channel 650.

The carbon dioxide supply flow channel 650 guides the carbon dioxide stored in the carbon dioxide cylinder 620 to the mixing pipe 630.

On the carbon dioxide supply flow channel 650, a carbon dioxide supply valve 651 which opens and closes the carbon dioxide supply flow channel 650, a carbon dioxide regulator 653 which controls the pressure of the carbon dioxide, a carbon dioxide pressure sensor 655 which senses the pressure of discharging the carbon dioxide from the carbon dioxide cylinder 620, and a safety valve 659 which automatically discharges the carbon dioxide inside the carbon dioxide supply flow channel 650 to the outside when pressure inside the carbon dioxide supply flow channel 650 exceeds a reference pressure.

The carbon dioxide supply valve 651 opens or closes the carbon dioxide supply flow channel 650.

When the carbon dioxide supply valve 651 is open, the carbon dioxide stored in the carbon dioxide cylinder 120 is mixed with the purified water pumped by the purified water pump 610 in the mixing pipe 630, thereby preparing the carbonated water.

A pilot valve open and closed by the purified water supplied to the mixing pipe 630 may be employed as the carbon dioxide supply valve 651 described above.

In detail, the carbon dioxide supply valve 651 is open by the pressure of the purified water supplied to the mixing pipe 630. That is, the carbon dioxide supply valve 651 is open when the purified water is supplied to the mixing pipe 630 and is closed when the purified water is not supplied to the mixing pipe 630.

However, the carbon dioxide supply valve 651 is not limited to the pilot valve. For example, a solenoid valve which operates independently from the purified water pump 610 may be employed as the carbon dioxide supply valve 651.

The carbon dioxide regulator 653 may be provided at a carbon dioxide outlet of the carbon dioxide cylinder 620 to control the pressure of the carbon dioxide discharged from the carbon dioxide cylinder 620. In detail, the carbon dioxide regulator 653 may reduce the pressure of the carbon dioxide supplied to the mixing pipe 630.

The carbon dioxide pressure sensor 655 is provided at a carbon dioxide outlet of the carbon dioxide regulator 653 and senses the pressure of the carbon dioxide decompressed by the carbon dioxide regulator 653.

When the pressure of the carbon dioxide decompressed by the carbon dioxide regulator 653 is lower than a predetermined reference supply pressure, the carbon dioxide pressure sensor 655 described above may employ a pressure switch which outputs a low pressure sensing signal corresponding thereto.

The safety valve 659 may be automatically open when the pressure inside the carbon dioxide supply flow channel 650 exceeds a reference pressure and may be provided on a carbon dioxide discharge flow channel 650*a* diverged from the carbon dioxide supply flow channel 650.

The mixing pipe 630 mixes the purified water output from the purified water pump 610 with the carbon dioxide output from the carbon dioxide cylinder 620. In the mixing pipe 630, the purified water and the carbon dioxide are mixed, thereby preparing the carbonated water.

Also, the concentration of the carbonated water may be controlled by controlling the pressure of the purified water and the pressure of the carbon dioxide supplied to the mixing pipe 630. As the pressure of the carbon dioxide is higher compared with the pressure of the purified water, the concentration of the carbonated water increases. As the pressure of carbon dioxide is lower, the concentration of the carbonated water decreases.

Also, a discharge amount of the carbonated water may vary according to the pressure of the purified water and the pressure of the carbon dioxide supplied to the mixing pipe 630.

When the pressure of the purified water is higher than the pressure of the carbon dioxide, the discharge amount of the carbonated water is determined by the pressure of the purified water. When the pressure of the purified water is smaller than the pressure of the carbon dioxide, the discharge amount of the carbonated water is affected by both the pressure of the purified water and the pressure of the carbon dioxide.

Accordingly, when the pressure of the purified water is identical to the pressure of the carbon dioxide, the carbonated water in uniform concentration may be discharged the most. As described above, the pressure of the purified water and the pressure of the carbon dioxide supplied to the mixing pipe 630 may be identical to each other.

However, it is not limited thereto. It is possible to prepare carbonated water in various concentrations by variously controlling a ratio of the pressure of the purified water to the pressure of the carbon dioxide.

The purified water discharge flow channel 660 guides the purified water supplied from the purified water supply module 70 to the integrated discharge flow channel 690 and includes a purified water discharge valve 661 which opens and closes the purified water discharge flow channel 660.

The integrated discharge flow channel 690 guides the carbonated water or the purified water to the dispenser module 200 and includes a carbonated water discharge valve 691 which controls discharging the carbonated water.

A three way valve which connects the integrated discharge flow channel 690 with any one of the mixing pipe 630 and the purified water discharge flow channel 660 may be employed as the carbonated water discharge valve 691, as shown in FIG. 29.

However, the carbonated water discharge valve 691 is not limited to the three way valve. For example, when the integrated discharge flow channel 690 employs a Y-shaped flow channel, the carbonated water discharge valve 691 may employ a two way valve provided at the integrated discharge flow channel 690 and the mixing pipe 630.

As described above, the carbonated water preparing module 600 may supply purified water and carbon dioxide to the mixing pipe 630 and may prepare and discharge carbonated water in the mixing pipe 630.

FIG. 30 illustrates yet another example of the carbonated water preparing module and the purified water supply module included in the refrigerator according to one embodiment of the present disclosure.

Referring to FIG. 30, the purified water supply module 70 is identical to the purified water supply module 70 described above with reference to FIG. 29.

However, compared with the carbonated water preparing module 600 described above with reference to FIG. 29, the carbonated water preparing module 600 further includes a carbonated water tank 680.

The carbonated water tank 680 may be provided between the mixing pipe 630 and the carbonated water discharge valve 691 and may temporarily store carbonated water prepared in the mixing pipe 630.

While the carbonated water prepared in the mixing pipe 630 is being stored in the carbonated water tank 680, the carbon dioxide may dissolve in the purified water. The concentration of the carbonated water discharged through the dispenser module 200 may be higher than being without the carbonated water tank 680.

Also, the carbonated water tank 680 may buffer the pressure of supplying the purified water from the purified water pump 610 and the pressure of supplying the carbon dioxide output from the carbon dioxide cylinder 620. In other words, the carbonated water tank 680 may prevent the carbonated water from being discharged at a high pressure when an operation of the purified water pump 610 starts.

FIG. 31 illustrates another example of the flow of the control signal between the components included in the refrigerator according to one embodiment of the present disclosure. FIGS. 32 and 33 illustrate another example of the dispenser module included in the refrigerator according to one embodiment of the present disclosure.

As shown in FIG. 31, the refrigerator 1 may include the flow channel switch valve 75 included in the purified water supply module 70 and the purified water pump 610, the carbonated water discharge valve 691, and the purified water discharge valve 661 included in the carbonated water preparing module 600.

Also, the refrigerator 1 may further include a dispenser module 700, the user interface 300 which interacts with the user, a storage unit 800 which stores programs and data related to the operation of the refrigerator 1, and a control unit 900 which generally controls the operation of the refrigerator 1.

Since the user interface 300 is identical to the user interface 300 described with reference to FIG. 18, a description thereof will be omitted. Also, since the purified water supply module 70 and the carbonated water preparing module 600 have been described above with reference to FIGS. 29 and 30, a description thereof will be omitted.

The dispenser module 700, as shown in FIG. 32, may include a water dispensing space 710 which allows water or ice to be taken out by inserting a container such as a cup, a dispenser lever 720 for discharging purified water or carbonated water, and a dispenser nozzle 730 through which the purified water or carbonated water is discharged.

As shown in FIG. 33, the dispenser lever 720 may include a dispenser lever body 721, a first dispenser lever 723, and a second dispenser lever 725.

The first dispenser lever 723 is formed to extend downward from the dispenser lever body 721. Also, the first dispenser lever 723 may pivot forward and backward about a pivot provided in the dispenser lever body 721.

In detail, the first dispenser lever 723 pivots backward due to an external force. When the external force is removed, the first dispenser lever 723 returns to a forward position due to an elastic member.

The user may pressurize the first dispenser lever 723 to be provided with the purified water from the refrigerator 1. While the first dispenser lever 723 is being pressurized, the refrigerator 1 discharges the purified water through the dispenser nozzle 730.

When an appropriate amount of the purified water is discharged, to stop discharging of the purified water, the user may release the pressurization of the first dispenser lever 723. When the pressurization of the first dispenser lever 723 is released, the refrigerator 1 stops discharging the purified water.

The second dispenser lever 725 may be formed to extend downward from the dispenser lever body 721 and may be located in front of the first dispenser lever 723 described above. Also, the second dispenser lever 725 may pivot forward and backward about a pivot provided in the dispenser lever body 721.

In detail, the second dispenser lever 725 pivots backward due to an external force. When the external force is removed, the second dispenser lever 725 returns to a forward position due to an elastic member.

The user may pressurize the second dispenser lever 725 to be provided with the carbonated water from the refrigerator 1. While the second dispenser lever 725 is being pressurized, the refrigerator 1 may continuously discharge the carbonated water through the dispenser nozzle 730.

When an appropriate amount of the carbonated water is discharged, to stop discharging of the carbonated water, the pressurization of the second dispenser lever 725 may be released. When the pressurization of the second dispenser lever 725 is released, the refrigerator 1 stops discharging the carbonated water.

The storage unit 800 stores a program and data related to a cooling operation of the refrigerator 1 and a program and data related to preparing the carbonated water.

For example, the storage unit 800 may store a target temperature of the refrigeration compartment 20 and a target temperature of the freezing compartment 30 related to the cooling operation and may store a water level, a present concentration, and target concentration of carbonated water related to the preparing of the carbonated water.

The storage unit 800 described above may include a nonvolatile memory which permanently stores programs and data for controlling the operation of the refrigerator 1 such as a magnetic disc drive and a solid state drive.

The control unit 900 generally controls the operation of the refrigerator 1.

In detail, the control unit 900 may control the carbonated water preparing module 600 to prepare carbonated water according to a carbonated water preparing command of the user and the target concentration.

The control unit 900 described above may include a memory 920 which stores a control program and control data from the storage unit 800 and a microprocessor 910 which performs an operation according to the control program and control data stored in the memory 920.

The memory 920 may include a volatile memory such as an SRAM and a DRAM. However, the memory 920 is not limited thereto and may include a non-volatile memory such as a flash memory and EPROM as necessary.

The microprocessor 910 performs the operation to control various components included in the refrigerator 1 according to the control program and control data stored in the memory 920.

In detail, the microprocessor 910 processes a control command input through the user interface 300 and performs an operation for controlling the purified water pump 610, the carbonated water discharge valve 691, and the purified water discharge valve 661.

An operation of the refrigerator 1 which will be described below may be considered as an operation caused by a control operation of the control unit 900.

Hereinafter, the operation of the refrigerator 1 according to one embodiment of the present disclosure, and more particularly, a carbonated water preparing operation of the carbonated water preparing module 600 will be described.

FIG. 34 illustrates another example of the method of preparing carbonated water in which the refrigerator prepares the carbonated water according to one embodiment of the present disclosure.

Referring to FIG. 34, a method 2000 of preparing carbonated water performed by the refrigerator 1 according to one embodiment will be described.

The refrigerator 1 determines whether a carbonated water discharge command is input (S2010).

The user may input the carbonated water discharge command using the dispenser lever 720 of the dispenser module 700. In detail, the user may input the carbonated water discharge command by pressurizing the second dispenser lever 725 backward.

When the carbonated water discharge command is not input (NO for S2010), the refrigerator 1 continues an operation which has been previously performed.

When the carbonated water discharge command is input (YES for S2010), the refrigerator 1 mixes purified water with carbon dioxide and discharges carbonated water (S2020).

The refrigerator 1 may control the carbonated water discharge valve 691 to connect the mixing pipe 630 with the integrated discharge flow channel 690 to discharge the carbonated water.

After that, the refrigerator 1 may operate the purified water pump 610 to supply the purified water. When the purified water pump 610 is operated, the purified water supplied from the purified water supply module 70 is pumped to the mixing pipe 630.

Also, due to the purified water pumped to the mixing pipe 630, the carbon dioxide supply valve 651 is open and the carbon dioxide is supplied to the mixing pipe 630.

As described above, when the purified water pump 610 is operated, not only the purified water is supplied to the mixing pipe 630 but also the carbon dioxide is supplied thereto in such a way that the purified water and the carbon dioxide are mixed in the mixing pipe 630 to prepare the carbonated water.

Also, the carbonated water prepared in the mixing pipe 630 is discharged through the integrated discharge flow channel 690 due to the pressure of the purified water output from the purified water pump 610.

While the carbonated water is being prepared and discharged from the mixing pipe 630, the refrigerator 1 determines whether the input of the carbonated water discharge command is stopped (S2030).

The user may stop the input of the carbonated water discharge command by releasing the pressurization of the second dispenser lever 725.

When the input of the carbonated water discharge command is continued (NO for S2030), the refrigerator 1 continues preparing and discharging the carbonated water.

When the input of the carbonated water discharge command stops (YES for S2030), the refrigerator 1 stops preparing and discharging the carbonated water.

In detail, the refrigerator 1 stops the operation of the purified water pump 610. When the operation of the purified water pump 610 is stopped, supplying the purified water to the mixing pipe 630 is stopped and the carbon dioxide supply valve 651 is closed.

As a result thereof, mixing the purified water with the carbon dioxide in the mixing pipe 630 is stopped. That is, preparing of the carbonated water is stopped.

After that, the refrigerator 1 controls the carbonated water discharge valve 691 to prevent the mixing pipe 630 and the integrated discharge flow channel 690 form being connected with each other. As a result thereof, discharging of the carbonated water is stopped.

As described above, the refrigerator 1 may instantaneously prepare carbonated water by supplying purified water and carbon dioxide to the mixing pipe 630 at the same time.

The invention claimed is:

1. A refrigerator capable of preparing carbonated water, comprising:
    a carbon dioxide cylinder configured to store carbon dioxide;
    a dispenser module configured to accommodate an external container and supply the carbon dioxide and water to the external container; and
    a controller configured to:
        supply the water to the external container,
        control supply of the carbon dioxide to the external container when supplying of the water to the external container that is accommodated in the dispenser module is completed, and
        repeat supplying the carbon dioxide to the external container and discharging the carbon dioxide from the external container.

2. The refrigerator of claim 1, further comprising:
    a water supply valve configured to control the water supplied to the external container; and
    a carbon dioxide supply valve configured to control the carbon dioxide supplied from the carbon dioxide cylinder to the external container,
    wherein the controller opens the water supply valve to supply the water to the external container and to open the carbon dioxide supply valve to supply the carbon dioxide to the external container.

3. The refrigerator of claim 2, further comprising:
    a carbon dioxide discharge valve configured to control the carbon dioxide discharged from the external container,
    wherein the controller opens the carbon dioxide discharge valve to discharge the carbon dioxide from the external container.

4. The refrigerator of claim 1, further comprising a user interface which interacts with a user.

5. The refrigerator of claim 4, wherein the controller determines a target supply amount of the carbon dioxide according to a target concentration input through the user interface.

6. The refrigerator of claim 5, wherein the controller finishes preparing the carbonated water when the carbon dioxide reaches the target supply amount.

7. The refrigerator of claim 4, wherein the controller finishes preparing the carbonated water when a number of opening and closing the carbon dioxide supply valve and the carbon dioxide discharge valve reaches a carbon dioxide injection number input through the user interface.

8. The refrigerator of claim 4, wherein when a preparing command for the carbonated water is input through the user interface, the controller determines whether the external container is inserted in the dispenser module.

9. The refrigerator of claim 8, wherein the controller controls the user interface to display information related to the external container being inserted in the dispenser module and receives a confirmation of whether the external container is inserted through the user interface.

10. The refrigerator of claim 8, wherein the controller determines whether the external container is inserted according to a sensing result of a sensor provided in the dispenser module.

11. The refrigerator of claim 8, wherein when the external container is not inserted, the controller controls the user interface to display an external container non-insertion message.

12. A refrigerator, comprising:
    a carbon dioxide cylinder configured to store carbon dioxide; and
    a dispenser module configured to accommodate an external container separable from the refrigerator and supply the carbon dioxide and water to the external container,
    wherein the dispenser module comprises:
        an external container coupler coupled with the external container, and
        a dispenser nozzle through which the water and the carbon dioxide are discharged,
    wherein the refrigerator repeats supplying the carbon dioxide to the external container and discharging the carbon dioxide from the external container.

13. The refrigerator of claim 12, wherein the dispenser nozzle comprises:
    a first discharge pipe;
    a second discharge pipe which is provided inside the first discharge pipe and protrudes from the first discharge pipe when the carbon dioxide is supplied; and
    an elastic body configured to return the second discharge pipe to an original position when the second discharge pipe protrudes from the first discharge pipe.

14. The refrigerator of claim 13, wherein when the carbon dioxide is supplied, the second discharge pipe protrudes to allow one end thereof to be located below a surface of water contained in the external container.

* * * * *